US010922665B2

(12) United States Patent
Miller et al.

(10) Patent No.: US 10,922,665 B2
(45) Date of Patent: Feb. 16, 2021

(54) AUTOMATIC GENERATION AND POPULATION OF DIGITAL INTERFACES BASED ON ADAPTIVELY PROCESSED IMAGE DATA

(71) Applicant: The Toronto Dominion Bank, Toronto (CA)

(72) Inventors: Robert Kyle Miller, Mississauga (CA); Sonja Torbica, Toronto (CA); Helene Nicole Esposito, Mississauga (CA); Harrison Michael James Reilly, Toronto (CA); Matta Wakim, Petersburg (CA); Kyryll Odobetskiy, Waterloo (CA); Dexter Lamont Fichuk, Kitchener (CA); Adam Douglas McPhee, Waterloo (CA); Omas Abdullah, Waterloo (CA); Patrick Jian Hong Hum, Ottawa (CA)

(73) Assignee: The Toronto-Dominion Bank, Toronto (CA)

(*) Notice: Subject to any disclaimer, the term of this patent is extended or adjusted under 35 U.S.C. 154(b) by 231 days.

(21) Appl. No.: 16/019,721

(22) Filed: Jun. 27, 2018

(65) Prior Publication Data
US 2020/0005258 A1 Jan. 2, 2020

(51) Int. Cl.
*G06Q 20/14* (2012.01)
*G06Q 30/04* (2012.01)
(Continued)

(52) U.S. Cl.
CPC ......... *G06Q 20/102* (2013.01); *G06F 40/174* (2020.01); *G06K 9/00422* (2013.01); *G06K 9/00456* (2013.01)

(58) Field of Classification Search
CPC ............................ G06Q 20/102; G06F 40/174
(Continued)

(56) References Cited

U.S. PATENT DOCUMENTS

| 7,499,588 B2 | 3/2009 | Jacobs et al. |
| 9,400,806 B2 | 7/2016 | Ramachandrula et al. |

(Continued)

OTHER PUBLICATIONS

"Kofax Mobile Bill Pay," retrieved from https://www.kofax.com/products/Mobile-Capture/Mobile-Bill-Pay-Overview on May 1, 2018 (5 pages).

(Continued)

*Primary Examiner* — Hai Tran
(74) *Attorney, Agent, or Firm* — Duane Morris LLP

(57) ABSTRACT

The disclosed embodiments include computer-implemented systems, apparatuses, and processes that, among other things, automatically generate and populate digital interfaces based on adaptively processed image data captured by a network-connected device operating within a computing environment. For example, an apparatus may receive, from a device, a first signal that includes image data identifying a document associated with a data exchange capable of initiation by the device. The apparatus may detect, within a first portion of the image data, a presence of first textual content associated with a first parameter of the data exchange, extract a first value characterizing the first parameter from the first textual content, and generate and transmit a second signal that includes the first value to the device. The second signal includes information that instructs the device to display the first value within a portion of an interface corresponding to the first parameter.

20 Claims, 11 Drawing Sheets

(51) Int. Cl.
    *G06Q 20/00*    (2012.01)
    *G06Q 20/10*    (2012.01)
    *G06K 9/00*     (2006.01)
    *G06F 40/174*   (2020.01)

(58) Field of Classification Search
    USPC .......................................................... 705/40
    See application file for complete search history.

(56) References Cited

U.S. PATENT DOCUMENTS

| | | | |
|---|---|---|---|
| 9,672,510 B2* | 6/2017 | Roach | G06Q 20/042 |
| 2013/0346302 A1* | 12/2013 | Purves | G06Q 20/102 |
| | | | 705/40 |
| 2015/0170118 A1 | 6/2015 | Finley | |
| 2017/0032350 A1 | 2/2017 | Moshal | |
| 2017/0142554 A1* | 5/2017 | Li | H04W 4/21 |

OTHER PUBLICATIONS

"Pay Bills by Taking a Picture," retrieved from https://www.customersbank.com/picturepay/ on May 1, 2018 (3 pages).
"Papaya Payments—Pay Any Bill," retrieved from https://itunes.apple.com/us/app/id1050870627?mt=8 on May 1, 2018 (3 pages).
Larsson et al., "Automated Invoice Handling With Machine Learning and OCR," 2016 (68 pages).
"Mobile Direct: Snap-To-Pay," retrieved from https://www.fiserv.com/payments/biller/mobile-direct-snap-to-pay.aspx?t=150823044328 on May 1, 2018 (2 pages).
"Prism Bills & Money," retrieved from https://itunes.apple.com/us/app/prism-bills-money/id522138897?mt=8 on May 1, 2018 (3 pages).

* cited by examiner

346 → Your Bell™ Bill

JOHN SMITH

555 Main Street NW

Washington, D.C. 20005

BILL DATE: August 1, 2018

348 → ACCOUNT NUMBER: 555 123 4567

ELECTRONIC BANKING ID: 1234 1234 56789 888

SUMMARY OF YOUR ACCOUNT

350 → Total amount due  $65.02

352 → Your payment is due by  September 1, 2018

SUMMARY OF YOUR CHARGES

Previous charges   $67.75

Payments   -$67.75

Current charges

Fixed Monthly Charges   $57.54

Taxes   $ 7.48

354 → Total Current charges  $65.02

356 → Total Amount Due  $65.02

Please pay upon receipt. To avoid late charges, please

358 → ensure we receive payment in full by September 1, 2018

FIG. 3E

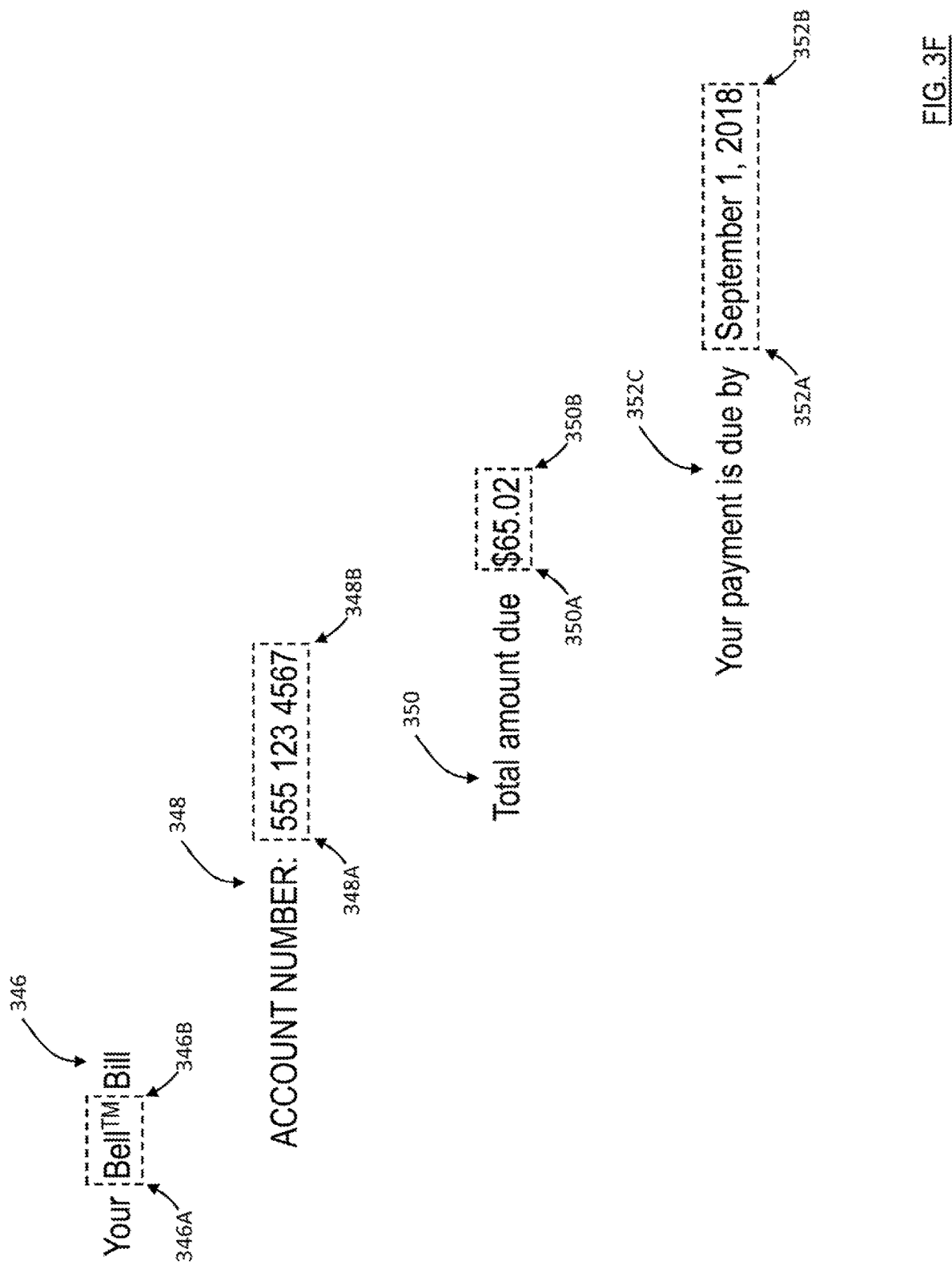

AUTOMATIC GENERATION AND POPULATION OF DIGITAL INTERFACES BASED ON ADAPTIVELY PROCESSED IMAGE DATA

TECHNICAL FIELD

The disclosed embodiments generally relate to computer-implemented systems and processes that automatically generate and provision digital interfaces based on dynamically processed image data.

BACKGROUND

Today, payment systems and related technologies continuously evolve in response to advances in payment processing, such as the ongoing transition from branch banking to digital or mobile banking processes performed on a desktop computer or mobile device. These innovations result in additional mechanisms for submitting payment to an electronic or physical merchant and for flexibly funding transactions initiated by the electronic or physical merchant. These innovations also extend beyond the input and display capabilities of many mobile devices.

SUMMARY

In some exemplary embodiments, an apparatus, includes a communications unit, a storage unit storing instructions, and at least one processor coupled to the communications unit and the storage unit. The at least one processor is configured to execute the instructions to receive a first signal from a device via the communications unit. The first signal includes image data that identifies a document, and the document is associated with an exchange of data capable of initiation by the device. The at least one processor is further configured to execute the instructions to detect, within a first portion of the image data, a presence of first textual content associated with a first parameter of the data exchange, extract a first value characterizing the first parameter from the first textual content, and generate and transmit, via the communications unit, a second signal that includes the first value to the device. The second signal includes information that instructs the device to display, using a display unit, the first value within a portion of an interface corresponding to the first parameter.

In additional exemplary embodiments, a computer-implemented method includes receiving, by one or more processors, a first signal from a device. The first signal includes image data that identifies a document, and the document is associated with an exchange of data capable of initiation by the device. The method also includes detecting, by the one or more processors, and within a first portion of the image data, a presence of first textual content associated with a first parameter of the data exchange, extracting, by the one or more processors, a first value characterizing the first parameter from the first textual content, and generating and transmitting, by the one or more processors, a second signal that includes the first parameter value to the device. The second signal includes information that instructs the device to display, using a display unit, the first parameter value within a portion of an interface corresponding to the first parameter of the data exchange.

Further, in some exemplary embodiments, a system includes a communications unit, a storage unit storing instructions, and at least one processor coupled to the communications unit and the storage unit. The at least one processor being is configured to execute the instructions to receive image data captured by a digital camera. The image data identifies a document, and the document is associated with an exchange of data. The at least one processor is configured to execute the instructions to generate and transmit, via the communications unit, a first signal that includes the image data to an additional computing system. The first signal includes information that instructs the additional computing system to detect, within a portion of the image data, a presence of textual content associated with a parameter of the data exchange, and to extract a value characterizing the parameter from the textual content. The at least one processor is configured to execute the instructions to receive a second signal from the additional computing system via the communications unit, the second signal comprising the extracted parameter value and in response to the received second signal, display, using a display unit, the extracted parameter value within a portion of an interface corresponding to the parameter of the data exchange.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

BRIEF DESCRIPTION OF THE DRAWINGS

FIGS. 3C, 3D, 3E, and 3F are diagrams illustrating elements of processed image data, consistent with the disclosed embodiments.

DETAILED DESCRIPTION

Figure 1:
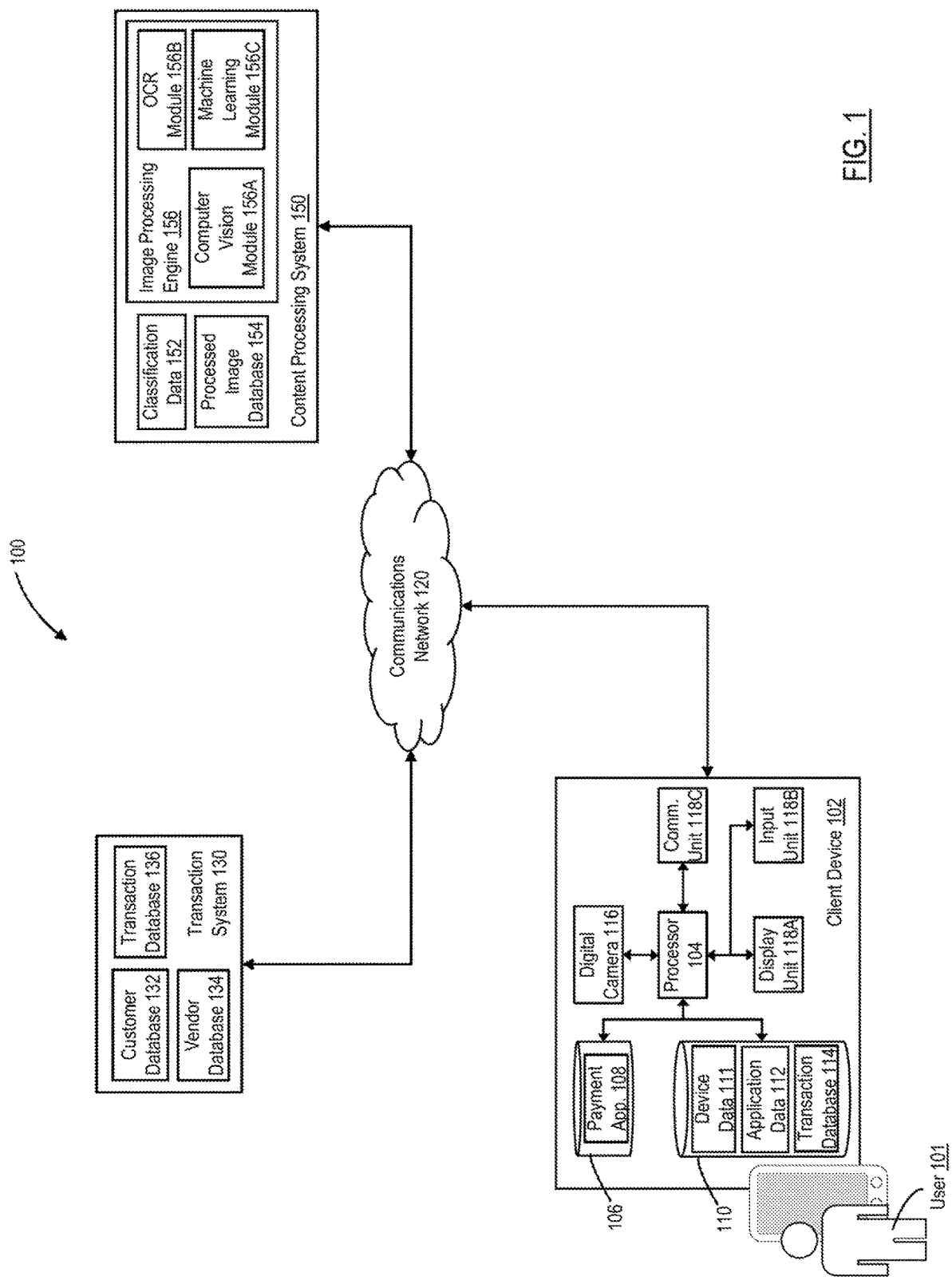
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented systems, apparatuses, and processes that, among other things, automatically generate and populate digital interfaces based on adaptively processed image data captured by one or more network-connected devices operating within a computing environment. By way of example, and as described herein, a computing system operating within the computing environment (e.g., a "content provisioning system") may receive a first signal that include information generated by an application program executed at a network-connected device (e.g., a "client device") operating within the computing environment. The information may include image data identifying a document associated with an exchange of data capable of initiation by the executed application program, and in some instances, a digital camera included within, or in communication with, the client device may capture the image data in response to input received from a user, e.g., as provided to a corresponding input unit of the client device.

In some embodiments, the receipt of the first signal, and the image data included therein, may cause the content provisioning system to perform, either alone or in conjunction with other network-connected computing systems operating within the computing environment, any of the exemplary processes described herein to detect a presence of textual content associated with one or more parameters of the data exchange within corresponding portions of the image data, and further, to extract a value characterizing each of the one or more parameters from that detected textual content. For instance, the content provisioning system may parse the received first signal to extract the image data, and may apply one or more adaptive computer vision algorithms to the extracted image data. Based on the application of the adaptive machine or computer vision algorithms, the content provisioning system may identify one or more portions of the image data that include textual content (e.g., that corresponds to bounded regions within the document), and may apply one or more image processing techniques or optical character recognition (OCR) algorithms to the identified portions of the image data to recognize and obtain the textual content.

As described herein, the content provisioning system may also perform operations that classify the groups of the recognized textual content in accordance with corresponding classifications parameters, e.g., based on an application of one or more machine learning algorithms to each of the groups of textual content. The classification parameters may, in some instances, be associated with the data exchange and additionally or alternatively, with the document identified by the received image data. The machine learning algorithms may include, but are not limited to, a one-dimensional, convolutional neural network model, and the one or more machine learning algorithms may be trained against, and adaptively improved using, elements of previously classified image data identifying documents associated with the data exchange (e.g., as maintained locally by the content provisioning system).

Subsequent to classifying the textual content, the content provisioning system may further process each element of the classified textual content to identify, and extract, a value characterizing the corresponding one of the classification parameters, e.g., based on an application of one or more additional machine learning algorithms to each of the elements of textual content. By way of the example, the additional machine learning algorithms may include, but are not limited to, an adaptive natural language processing algorithm that, among other things, predicts starting an ending indices of a candidate parameter value within each element of textual content, extracts the candidate parameter value in accordance with the predicted indices, and computes a confidence score for the candidate parameter value that reflects a probability that the candidate parameter value accurately represents the corresponding classification parameter. As described herein, the one or more additional machine learning algorithms may be trained against, and adaptively improved using, the locally maintained elements of previously classified image data identifying documents associated with the data exchange.

The content provisioning system may, in some instances, generate output data that not only identifies each of the classification parameters, but also links each of the data-exchange parameters to a corresponding one of the extracted parameter values (or to a corresponding set of extracted parameter values and associated confidence scores). The content provisioning system may transmit the generated output data to the client device (e.g., via a second signal transmitted through a corresponding programmatic interface), and based on portion of the received output data, the client device may perform operations that display, to the user via a display unit, each of the extracted parameter values within a portion of an interface associated with the corresponding data-exchange parameter.

By way of example, as described herein, the executed application program may display the extracted parameter values the corresponding portion of the interface (e.g., may "populate" the interface) automatically and without additional intervention or input from the user of the client device. Further, and in response to the presentation of the populated interface, the client device may receive additional input from the user, e.g., through a corresponding input unit, that verifies an accuracy of the displayed parameter values, or alternatively, that modifies one or more of the displayed parameter values. In some instances, the executed application program may perform operations that initiate the data exchange in accordance with the displayed or modified parameter values, and further, may transmit the displayed or modified parameter values, and the corresponding data-exchange parameters, to the content provisioning system, e.g., for training or adaptive modification of any of the machine learning algorithms described herein.

In one example, described herein, the executed application program may correspond to a payment application provisioned to the client device by a network-connected computing system, such as but not limited to, a transaction system operated by a financial institution. For instance, a user associated with the client device may hold a financial services account issued by the financial institution (e.g., a deposit account, a credit card account, etc.), Further, when executed by the client device, the payment application may cause the client device to generate and display, via the display unit, a graphical user interface that enables an initiation of a payment transaction involving the user's financial services account and an additional financial services account held by a payee, such as a vendor that issues invoices or bills. The payment may, in some instances, satisfy an existing obligation between the user and the vendor, such as that established by an invoice or bill issued by the vendor, and the generated and displayed interface may enable the user to initiate or schedule a single payment to the vendor (e.g., in satisfaction of the invoice or bill) and additionally, or alternatively, to establish a recurring payment to the vendor (e.g., in satisfaction of a recurring bill, such as monthly invoice issued by a provider of wireless services).

In some instances, the payment transaction may correspond to an electronic transfer of funds between the user's financial services account and a corresponding financial services account maintained on behalf of the vendor at one or more financial institutions, and the generated and presented interface may include interface elements, such as fillable text boxes, that enable the user to specify values of one or more parameters that characterize the payment transaction. Examples of these parameter values may include, but are not limited to, a unique identifier of the vendor (e.g., a vendor name, etc.), a payor identifier (e.g., an account number or other unique character string assigned to the user by the vendor, etc.), a payment amount, and a payment date.

The user may, in some instances, provide input to the client device (e.g., via a corresponding input unit, such as a pressure-sensitive, touchscreen display) that specifies each of the parameter values, and the executed payment application may perform operations that "populate" the presented interface by displaying each of a specified parameter values within a corresponding one of the interface elements, e.g., the text boxes. The user may also provide additional input to the client device (e.g., via the corresponding input unit) that requests an initiation of the payment transaction in accordance with the specified and populated parameter values and additionally, or alternatively, that associates the specified parameter values with a recurring payment transaction during corresponding temporal intervals (e.g., on a monthly basis, quarterly basis, etc.).

In many instances, however, a physical dimension or a functionality of the client device may limit an ability of the user to interact with, and to supply input to, interfaces generated and presented by the executed payment application. By way of example, the client device may include a mobile communications device, such as a smartphone having a pressure-sensitive, touchscreen display unit, and the physical dimensions of that display unit may reduce both an efficiency and an accuracy at which the user provides input to each of the multiple interface elements included within the payment interface. In other examples, the mobile communications device may correspond to a wearable device, such as a smart watch, having not only a display unit characterized by limited physical dimensions, but also an input unit characterized by a limited input functionality. In some instances, the limited input functionality of the input device, coupled with the limited physical dimension of the display unit, may degrade an ability of the user to interact with the presented payment interface and request an initiation of a payment transaction, or an establishment of a recurring payment transaction, based on user-input parameter values.

Certain of the exemplary, computer-implemented processes described herein, which identify parameter values that characterize a pending payment transaction based on application of adaptive computer vision and machine learning algorithms to captured image data, and which populate a digital interface generated and displayed at a client device with these identified parameter values automatically and without user intervention, can be implemented in addition to, or as an alternate to, conventional processes that populate multiple interface elements rendered for presentation within the graphical user interface based on discrete, and repetitive, user input. By automatically populating a digital interface with adaptively determined data, certain of these exemplary, computer-implemented processes may improve an ability of a user to interact with, and to provide input to, a graphical user interface rendered for presentation on mobile communications devices that incorporate display units characterized by limited physical dimensions and additionally, or alternatively, input units characterized by limited input functionalities.

Further, certain of these exemplary, computer-implemented processes, as described herein, can also be implemented in addition to, or as an alternate to, conventional processes that populate an interface element with a parameter value, or that provide recommended parameter values for the interface element, in accordance with certain user-provided input, such as one or more alphanumeric characters provided as an input to the interface element. By automatically populating interface elements without user intervention, and based on parameters values derived from an application of one or more computer vision or machine learning algorithms to captured image data, certain of these exemplary, computer-implemented processes improve an accuracy of the populated parameter values and further enhance an ability of a user to access and interact with complex digital interfaces on communications devices characterized by limited input functionality or limited display functionality, such as, but not limited to, wearable communications devices.

I. Exemplary Computing Environments

FIG. 1 is a diagram illustrating an exemplary computing environment 100, consistent with certain disclosed embodiments. As illustrated in FIG. 1, environment 100 may include one or more devices, such as client device 102 operated by user 101, a transaction system 130, and one or more content provisioning systems, such as content provisioning system 150, each of which may be interconnected through any appropriate combination of communications networks, such as network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet.

In an embodiment, client device 102 may include a computing device having one or more tangible, non-transitory memories that store data and/or software instructions, and one or more processors, e.g., processor 104, configured to execute the software instructions. The one or more tangible, non-transitory memories may, in some aspects, store software applications, application modules, and other elements of code executable by the one or more processors, e.g., within application repository 106.

For example, as illustrated in FIG. 1, client device 102 may maintain, within application repository 106, a payment application 108. In some instances, payment application 108 may be associated with and provisioned to client device 102 by transaction system 130, and further, may exchange data with transaction system 130 or content provisioning system 150 through one or more secure, programmatic interfaces, such as an application programming interfaces (API).

As described herein, when executed by processor 104, payment application 108 may perform any of the exemplary processes described herein to, among other things: (i) obtain image data associated identifying a physical document associated with a payment transaction (e.g., an outstanding bill or invoice issued by a vendor); (ii) transmit the image data across network 120 to content provisioning system 150 through a secure programmatic interface; (iii) receive parameter values characterizing the payment transaction from content provisioning system 150 through the secure, programmatic interface; and (iv) generate and present a graphical user interface associated with the payment transaction and populated with the received parameter values. Further, executed payment application 108 may perform additional operations that initiate the payment transaction in accordance with the received parameter value, or associate the received parameter values with a recurring payment transaction, as described herein.

Client device 102 may also establish and maintain, within the one or more tangible, non-tangible memories, one or more structured or unstructured data repositories or databases, e.g., data repository 110, that include device data 111, application data 112, and transaction database 114. In some instances, device data 111 may include data that uniquely identifies client device 102, such as a media access control (MAC) address of client device 102 or an IP address assigned to client device 102, and application data 112 may include information that facilitates a performance of operations by the one or more executable application programs maintained within application repository 106, e.g., payment application 108.

For example, application data 112 may include one or more authentication credentials that enable user 101 to initiate or schedule one or more payment transactions using payment application 108, such as, but not limited to, an alphanumeric user name or login credential, an alphanumeric password, or a biometric authentication credential (e.g., a digital image of user 101's face, a fingerprint scan, etc.). In other instances, application data 112 may also include cryptographic data that facilitates an initiation of a payment transaction by payment application 108, such as, but not limited to, a unique cryptogram, cryptographic key, hash value, commitment, or other cryptographic element that allows transaction system 130 to verify payment application 108 or client device 102.

Transaction database 114 may include data records that identify and characterize one or more payment transactions initiated by payment application 108 using any of the exemplary processes described herein. In some instances, and for a corresponding one of the initiated payment transactions, the data records of transaction database 114 may include one or more parameter values that characterize the initiated payment transaction, such as, but not limited to, a unique identifier of the vendor (e.g., a vendor name, etc.), a customer identifier (e.g., an account number or other unique character string assigned to the user by the vendor, etc.), a payment amount, and a payment date.

In other instances, the data records of transaction database 114 may also identify and characterize one or more payment transactions scheduled for initiation by payment application 108 at a single, scheduled date or time (e.g., a scheduled payment transaction) or at a recurring dates and times (e.g., a recurring payment transaction). By way of example, and for a corresponding one of the scheduled or recurring payment transactions, the data records of transaction database 114 may include one or more parameter values that characterize the scheduled or recurring payment transaction, such as, but not limited to, a unique identifier of the vendor (e.g., a vendor name, etc.), a customer identifier (e.g., an account number or other unique character string assigned to the user by the vendor, etc.), a payment amount, along with additional temporal data that identifies the scheduled or recurring date or time.

Referring back to FIG. 1, client device may also include a display unit 116A configured to present interface elements to user 101, and an input unit 116B configured to receive input from user 101, e.g., in response to the interface elements presented through display unit 116A. By way of example, display unit 116A may include, but is not limited to, an LCD display unit or other appropriate type of display unit, and input unit 116B may include, but is not limited to, a keypad, keyboard, touchscreen, voice activated control technologies, or appropriate type of input unit. Further, in additional aspects (not depicted in FIG. 1), the functionalities of display unit 116A and input unit 116B may be combined into a single device, e.g., a pressure-sensitive touchscreen display unit that presents interface elements and receives input from user 101. Client device 102 may also include a communications unit 116C, such as a wireless transceiver device, coupled to processor 104 and configured by processor 104 to establish and maintain communications with network 120 using any of the communications protocols described herein.

Further, as illustrated in FIG. 1, client device 102 may also include a digital camera 118, which may be coupled to processor 104. Digital camera 118 may, for instance, include a front-facing digital camera and/or a rear-facing digital camera, and in response to input provided to client device 102, e.g., via input unit 116B, digital camera 118 may be configured by processor 104 to capture image data identifying one or more objects or individuals within a physical environment of client device 102. Examples of these objects include, but are not limited to, an image of a document associated with a payment transaction, such as an outstanding invoice or bill.

Examples of client device 102 may include, but are not limited to, a personal computer, a laptop computer, a tablet computer, a notebook computer, a hand-held computer, a personal digital assistant, a portable navigation device, a mobile phone, a smartphone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

Referring back to FIG. 1, transaction system 130 and content provisioning system 150 may each represent a computing system that includes one or more servers (not depicted in FIG. 1) and tangible, non-transitory memory devices storing executable code and application modules. Further, the servers may each include one or more processor-based computing devices, which may be configured to execute portions of the stored code or application modules to perform operations consistent with the disclosed embodiments.

In other instances, and consistent with the disclosed embodiments, one or more of transaction system 130 and content provisioning system 150 may correspond to a distributed system that includes computing components distributed across one or more networks, such as network 120, or other networks, such as those provided or maintained by cloud-service providers. By way of example, content provisioning system 150 may include computing components distributed across a communications network maintained by a cloud-service provider (e.g., Google Cloud™, Microsoft Azure™, etc.). In some instances, the distributed computing components of content provisioning system 150 may collectively perform operations that establish an artificial neural network capable of, among other things, adaptively classifying textual content recognized within from captured image data and extracting, from the classified textual content, values of parameters that characterize an exchange of data associated with the captured image data. The disclosed embodiments are, however, not limited to these exemplary distributed systems, and in other instances, transaction system 130 and content provisioning system 150 may include computing components disposed within any additional or alternate computing systems or across any appropriate network.

In some instances, transaction system 130 may be associated with, or operated by, a financial institution that issues financial services accounts held by one or more customers, such as, but not limited to, a deposit account or credit card account held by user 101 and available to fund an initiated payment transaction. Transaction system 130 may also be configured to provision one or more executable application programs to one or more network-connected devices operating within environment 100, such as executable payment application 108 maintained by client device 102.

For example, client device 102 may execute payment application 108, and may perform operations that generate and transmit, across network 120 to transaction system 130 via a secure programmatic interface, a request to initiate or schedule a payment transaction in accordance with one or more values of corresponding transaction parameters. In response to the received request, transaction system 130 may perform any of the exemplary processes described herein to: (i) initiate and execute the requested payment transaction in accordance with the specified values of the transaction parameters (e.g., to electronically transfer, on a specified time or date, a specified amount of funds from a financial services account held by user 101 to an additional financial services account associated with a specified vendor); and/or (ii) schedule a recurring payment transaction based on all, or a portion, of the specified values of the transaction parameters (e.g., to electronically transfer, on a recurring basis, a specified amount of funds from a financial services account held by user 101 to an additional financial services account associated with a specified vendor).

Furthermore, and as described herein, transaction system 130 may also perform operations that provision one or more services to client device 102, e.g., via a digital interface generated by executed payment application 108. These provisioned services may, in some instances, be associated with, related to, or ancillary to the initiated and executed payment transactions, and additionally, or alternatively, may support an initiation and execution of one or more scheduled or recurring payment transaction.

To facilitate the performance of these exemplary processes, transaction system 130 may maintain, within one or more tangible, non-transitory memories, a customer database 132, a vendor database 134, and a transaction database 136. By way of example, customer database 132 may include data records that identify and characterize users of the one or more native application programs associated with, or supported by, transaction system 130, such as payment application 108 executed by client device 102. In some instances, the data records of customer database 132 may include, for each user, a corresponding login credential (e.g., an alphanumeric login name or user name) and data that uniquely identifies one or more devices associated with or operated by the user (e.g., a unique device identifier, such as an IP address, a MAC address, a mobile telephone number, etc.). Further, the data records of customer database 132 may also link the login credential of each user (and in some instances, the unique device identifier or identifiers) to one or more authentication credentials, which enable corresponding ones of the users to access transaction system 130 and initiate, schedule, or modify payment transactions involving various vendors (e.g., via client device 102 through a digital portion generated by executed payment application 108). Examples of these authentication credentials include, but are not limited to, an alphanumeric password, a biometric authentication credential (e.g., a fingerprint scan, a digital image of a user's face, etc.), or any combination thereof.

In further instances, the data records of customer database 132 may also include, for each of the users, account data that identifies and characterizes one or more payment instruments available to fund payment transactions initiated and executed by transaction system 130. Examples of the available payment instruments include, but are not limited to, a deposit account (e.g., a savings account or checking account), a credit card account, a line of credit (e.g., a home equity line-of-credit), or an investment or brokerage account issued to corresponding users by the financial institution associated with transaction system 130 and additionally, or alternatively, by other financial institutions.

For example, the account data maintained in customer database 132 on behalf of a corresponding one of the users, such as user 101, may include, but is not limited to, an identifier of each of the one or more payment instruments held by user 101 (e.g., a Visa™ credit card account issued by the financial institution, etc.), along with tokenized (or actual) account data associated with each of the one or more payment instruments held by user 101, and data characterizing a current status of each of the one or more payment instruments (e.g., a current balance of, and an amount of credit available, to the Visa™ credit card account, an indicator of a delinquency of the payment instruments, etc.). In some instances, the data records of customer database 132 may link the account data maintained on behalf of user 101 (and other users) to corresponding login credentials, unique device identifiers, and authentication credentials.

In further instances, customer database 132 may also maintain profile data that characterize each of the users of transaction system 130. By way of example, the elements of profile data may include, but are not limited to, a full name of each of the users, a mailing address for each of the users, and a value of one or more demographic parameters of each of the users, such as, but not limited to, an age, a gender, an occupation, an educational level, or an income level. The elements of profile data may also include, for each user, data characterizing one or more preferences for receiving notifications generated and transmitted by transaction system 130 (e.g., via client device 102 by a digital interface generated by executed payment application 108), and further, data characterizing one or more preferences for funding payment transactions initiated by transaction system 130. Further, in some instances, all or a portion of the profile data for each of the user may be established during an initial registration process (e.g., based on data received from client device 102 via a secure, programmatic interface), and as described herein, the data records of customer database 132 may link the profile data to corresponding login credentials, unique device identifiers, authentication credentials, and elements of account data.

Referring back to FIG. 1, vendor database 134 may include data records that identify and characterize one or more vendors involved in payment transactions initiated and executed by transaction system 130 using any of the exemplary processes described herein. For example, the data records of vendor database 134 may include an identifier of each of the vendors (e.g., a vendor name, a unique vendor identifier assigned the vendor by transaction system 130, etc.), along with account data identifying one or more accounts (e.g., an account number, a routing number, etc.) configured by computing systems associated with the vendors to receive funds electronically via payment transactions initiated at transaction system 130.

Transaction database 136 may include data records that identify and characterize one or more payment transactions initiated by transaction system 130 using any of the exemplary processes described herein. For example, and for a corresponding one of the initiated payment transactions, the data records of transaction database 136 may include, but are not limited to: a unique transaction identifier (e.g., an alphanumeric character string having a format consistent with one or more appropriate payment protocols); data that identifies the initiating user or device (e.g., the login credential of user 101 or the unique device identifier of client device 102); data that identifies the vendor (e.g., the vendor name, etc.); data identifying a corresponding user account issued by the vendor (e.g., an account number, etc.); a transaction amount; data identifying a payment instrument that funded the transaction amount (e.g., portion of a tokenized or actual account number of a payment instrument held by user 101); and a time or date at which transaction system 130 initiated the corresponding payment transaction. Further, in some instances, the data records of transaction database 136 may also include data confirming a settlement and clearance of the corresponding initiated payment transaction, e.g., a confirmation received from a corresponding settlement and clearance network.

In other instances, and consistent with the disclosed embodiments, the data records of transaction database 136 may also identify and characterize one or more payment transactions scheduled for initiation at a future date or time (e.g., a "scheduled" payment transaction), and additionally, or alternatively, one or more payment transactions scheduled for initiation on at recurring dates or time (e.g., a "recurring" transaction), by executed payment application 108 using any of the exemplary processes described herein. By way of example, and for a corresponding one of the scheduled or recurring payment transactions, the data records of transaction database 136 may maintain, among other things: data that identifies a scheduling user or device (e.g., the login credential of user 101 or the unique device identifier of client device 102); data that identifies the vendor (e.g., the vendor name, etc.); data identifying a corresponding user account issued by the vendor (e.g., an account number, etc.); a transaction amount; data identifying a payment instrument available to fund the transaction amount (e.g., portion of a tokenized or actual account number of a payment instrument held by user 101); and a single or recurring time or date at which transaction system 130 is scheduled to initiate the corresponding payment transaction. The disclosed embodiments are, however, not limited these examples of identifying and characterizing data, and in other instances, the data records of transaction database 136 may maintain any additional or alternate information appropriate to the initiated or scheduled payment transaction.

Content provisioning system 150 may, upon execution of stored software instructions, perform operations that receive elements of digital image data captured by one or more network-connected devices, such as client device 102, through a secure, programmatic interface, and that recognize textual content within corresponding portions of the digital image data based on an application of one or more computer vision algorithms and optical character recognition (OCR) algorithms to the received digital image data. Further, and based on application of one or more adaptive, machine learning algorithms to the recognized textual content, content provisioning system 150 may perform operations that adaptively classify portions of the recognized textual content and extract, from the classified portion of the recognized textual content, values of parameters that characterize an exchange of data associated with the received digital image data.

By way of example, and as described herein, the data exchange may correspond to a payment transaction capable of initiation at client device 102 by executed payment application 108, and the received digital image data may identify a document associated with that payment transaction, such as an outstanding invoice or bill issued to user 101 by a corresponding payee, such as a vendor. Further, in some instances, content provisioning system 150 may apply the one or more adaptive, machine learning algorithms to the recognized textual content to classify corresponding portions of that textual content in accordance with certain parameters of the payment transaction.

In some instances, as described herein, content provisioning system 150 may generate output data that includes the extracted parameter values and associated the extracted parameter values with corresponding ones of the classification parameters, and may provision the generated output data to one or more network-connected devices operating within environment 100, such as client device 102. As described herein, an application program executed by client device 102, such as payment application 108, may perform operations that process the received output data and present the each of the extracted parameter values within portions of an interface associated with corresponding ones of the linked classification parameters. The presentation of the extracted parameter values may "populate" the interface automatically and without intervention from user 101, and in some instances, executed payment application 108 may perform additional operations that initiate a payment transaction in accordance with the extracted parameters in response to a receipt of an additional input from user 101, e.g., via input unit 116B of client device 102, as described herein.

To facilitate the performance of these exemplary processes, content provisioning system 150 may maintain, within one or more tangible, non-transitory memories, classification data 152 and processed image database 154. In some instances, classification data 152 may identify one or more parameters, e.g., "classification" parameters, that facilitate a classification of corresponding elements or groups of recognized textual content based on any of the exemplary machine learning algorithms or processes described herein. The one or more classification parameters may correspond to parameters of an exchange of data capable of initiation by client device 102, such a payment transaction capable of initiation by executed payment application 108, and examples of the classification parameters include, but are not limited to, a vendor, an account label (e.g., reflecting an account issued to user 101 by the vendor), an amount due, and a due date.

Processed image database 154 may include data records that associate discrete elements of captured image data (e.g., which identify an invoice of bill issued by a corresponding vendor) with corresponding elements of output data generated based on an application of any of the exemplary computer vision, OR, and machine learning algorithms or processes described herein to the captured image data. For example, and for a particular element of captured image data, the corresponding output data may include, among other things, the textual content recognized within the particular element of captured image data, information that links portions or groups of the recognized textual content to corresponding ones of the classification parameters (e.g., as specified within classification data 152), and one or more extracted parameter values that correspond to each of the classification parameters. In some instances, processed image database 154 may maintain one or more of the output data elements as metadata, which may be appended for corresponding ones of the elements of captured image data, and one or more of the computer vision or machine learning algorithms processes, as described herein, may be adapted using, and trained against, portions of processed image database 154.

Further, as illustrated in FIG. 1, content provisioning system 150 may also maintain, within the one or more tangible, non-transitory memories, one or more executable application programs, such as an image processing engine 156 that includes a computer vision module 156A, an optical character recognition (OCR) module 1566, and a machine learning module 156C. For example, when executed by content provisioning system 150, computer vision module 156A may apply one or more computer vision processes to the captured image data and based an output of the one or more computer vision processes, computer vision module 156A may identify one or more portions of the captured image data that include textual content. In some instances, the application of the one or more computer vision processes to the captured image data may identify bounded regions within the captured image data (e.g., "sections") that include groups of textual content, and examples of the computer vision processes include, but are not limited to, a template matching algorithm, a scale-invariant feature transform (SIFT) algorithm, an adaptive pattern recognition algorithm, and additional, or alternate, computer vision algorithms consistent with the OpenCV® library and the Google Cloud Vision API™.

OCR module 156B, when executed by content provisioning system 150, may recognize the textual content within each of the identified portions of the captured image data based on an application of one or more OCR algorithms or processes to the identified portions of the captured image data. Examples of the one or more OCR algorithms include, but are not limited to, the Tesseract® OCR engine and one or more OCR processes consistent with the Google Cloud Vision API™.

In some instances, when executed by content provisioning system 150, machine learning module 156C may perform operations that adaptively classify portions of the recognized textual content in accordance with corresponding portions of classification data 152. By way of example, machine learning module 156C may classify the portions of the recognized textual content based on an application of one or more adaptive, machine learning processes to the recognized textual content and classification data 152. Examples of the one or more adaptive, machine learning processes include, but are not limited to, an artificial neural network model, such as a one-dimensional, convolutional neural network model (e.g., implemented using a corresponding neural network library, such as Keras®).

Further, and when executed by content provisioning system 150, machine learning module 156C may also perform operations that adaptively extract, from the classifieds portions of the recognized textual content, candidate values of parameters that characterize an exchange of data associated with the captured image data, such as a payment transaction associated with an outstanding invoice or bill identified within the captured image data. For example, based on an application of one or more additional, or alternate, machine learning processes to the classified portions of the recognized textual content, machine learning module 156C may perform operations that extract the candidate parameter value from each of the classified portions and generate a value (e.g., a "confidence" score) indicative of a probability that the candidate parameter value accurately, and correctly, characterizes the corresponding classification parameter within the underlying invoice or bill.

In some instances, the additional, or alternate, machine learning algorithms may include one or more adaptive, natural-language processing algorithms capable of parsing each of the classified portions of the recognized textual content and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

As described herein, one or more of the processes and algorithms implemented by computer vision module 156A, OCR module 156B, and machine learning module 156C may trained against, and adaptively improved using, elements of training data locally maintained by content provisioning system 150, such as, but not limited to, portions of classification data 152 and processed image database 154. Furthermore, the disclosed embodiments are not limited to those examples of computer vision processes, OCR algorithms, and machine learning processes described herein, and in other instances, computer vision module 156A, OCR module 1566, and machine learning module 156C may implement any additional, or alternate, adaptive process, statistical process, machine learning algorithms, or combinations thereof that would be appropriate to the captured image data or the textual content included therein.

II. Exemplary Computer-Implemented Processes for Automatically Generating and Populating Digital Interfaces based on Adaptively Processed Image Data In some embodiments, a network-connected computing system, such as content provisioning system 150 of FIG. 1, may perform operations that receive digital image data captured by a network-connected device, such as client device 102 of FIG. 1, through a secure, programmatic interface compatible with an application program executed by client device 102, such as an application programming interface (API) compatible with executed payment application 108 of FIG. 1. As described herein, the elements of captured image data may identify a document associated with, or relevant to, an exchange of data capable of initiation at client device 102, e.g., via the executed application program, and content provisioning system 150 may perform operations that recognize textual content within corresponding portions of the digital image data based on an application of one or more machine or computer vision algorithms to the received digital image data.

Based on an application of one or more adaptive, machine learning algorithms to the recognized textual content, content provisioning system 150 may perform operations that adaptively classify portions of the recognized textual content, e.g., in accordance with locally maintained classification data, such as classification data 152 of FIG. 1. Further, and based on an application of one or more additional adaptive, machine learning algorithms to the classified portions of the recognized textual content, content provisioning system 150 may also perform operations that extract, from the classified portions of the recognized textual content, candidate values of parameters that characterize an exchange of data associated with the received digital image data.

In some instances, as described herein, content provisioning system 150 may generate output data that includes the extracted parameter values, and associates the extracted parameter values with corresponding ones of the classification parameters. Content provisioning system 150 may perform further operations that provision the generated output data client device 102, e.g., across network 120 via the secure programmatic interface, and as described herein, an application program executed by client device 102, such as payment application 108, may perform operations that process the received output data and present the each of the extracted parameter values within portions of an interface associated with corresponding ones of the linked classification parameters. The presentation of the extracted parameter values may "populate" the interface automatically and without intervention from user 101, and in some instances, executed payment application 108 may perform additional operations that initiate or schedule a payment transaction in accordance with the extracted parameters in response to a receipt of an additional input from user 101, e.g., via input unit 116B of client device 102, as described herein.

By way of example, the exchange of data may correspond to a payment transaction, and the document associated with, or relevant to, the payment transaction may correspond to an invoice or bill issued to user 101 by a corresponding vendor. For instance, the corresponding vendor can include, but is not limited to, a provider of wireless communications services, such as Bell™ Canada, and the invoice may specify charges incurred for wireless data accessed by user 101 (e.g., via client device 102), during a corresponding monthly billing period.

Further, and as described herein, user 101 may also hold one or more payment instruments (e.g., a Visa™ credit card) issued by the financial institution that operates transaction system 130. In some instances, user 101 may provide, via client device 102, information to transaction system 130 that enables user 101 to register for, and participate in, one or more digital payment services provided by the financial institution. As described herein, these digital payment services may be supported by an executable application program provisioned to client device 102, such as executable payment application 108 of FIG. 1, and when executed by client device 102, payment application 108 may perform operations that enable user 101 to schedule an initiation of a single digital payment, or a scheduling of a recurring digital payment, funded by the Visa™ credit card issued by the financial institution and involving one or more corresponding vendors, such as Bell™ Canada.

For example, to schedule a digital payment for a monthly invoice issued by Bell™ Canada, user 101 may provide input to client device 102, via input unit 116B, that triggers an execution of payment application 108 (e.g., by establishing contact between a finger (or a stylus) and a portion of a surface of a pressure-sensitive, touchscreen display unit that corresponds to an icon representative of payment application 108). Upon execution of payment application 108, client device 102 may perform operations that generate and display, on display unit 116A, one or more interface elements that prompt user 101 to provide additional input specifying a login credential and one or more authentication credentials. As described herein, the login credential may include an alphanumeric user name or login name, the authentication credentials may include an alphanumeric password, a biometric authentication credential (e.g., an image of user 101's face or a scan of a fingerprint of user 101), or a combination thereof.

In some instances, user 101 may provide the additional input specifying the login credential and the one or more authentication credentials to client device 102, e.g., via input unit 116B. Client device 102 may perform operations that authenticate an identity of user 101 based on locally maintained data specifying the login and authentication credentials (e.g., within application data 112 of data repository 110) and additionally, or alternatively, based on data exchanged across network 120 with transaction system 130, e.g., via a secure programmatic interface. Further, and based on a successful authentication of the identity of user 101, client device 102 may perform additional operations that generate and display, on display unit 116A, one or more additional interface elements (e.g., collectively establishing a digital interface associated with executed payment application 108) that prompt user 101 to initiate a payment transaction by capturing a digital image of the outstanding Bell™ Canada bill, e.g., using digital camera 118.

Figure 2:
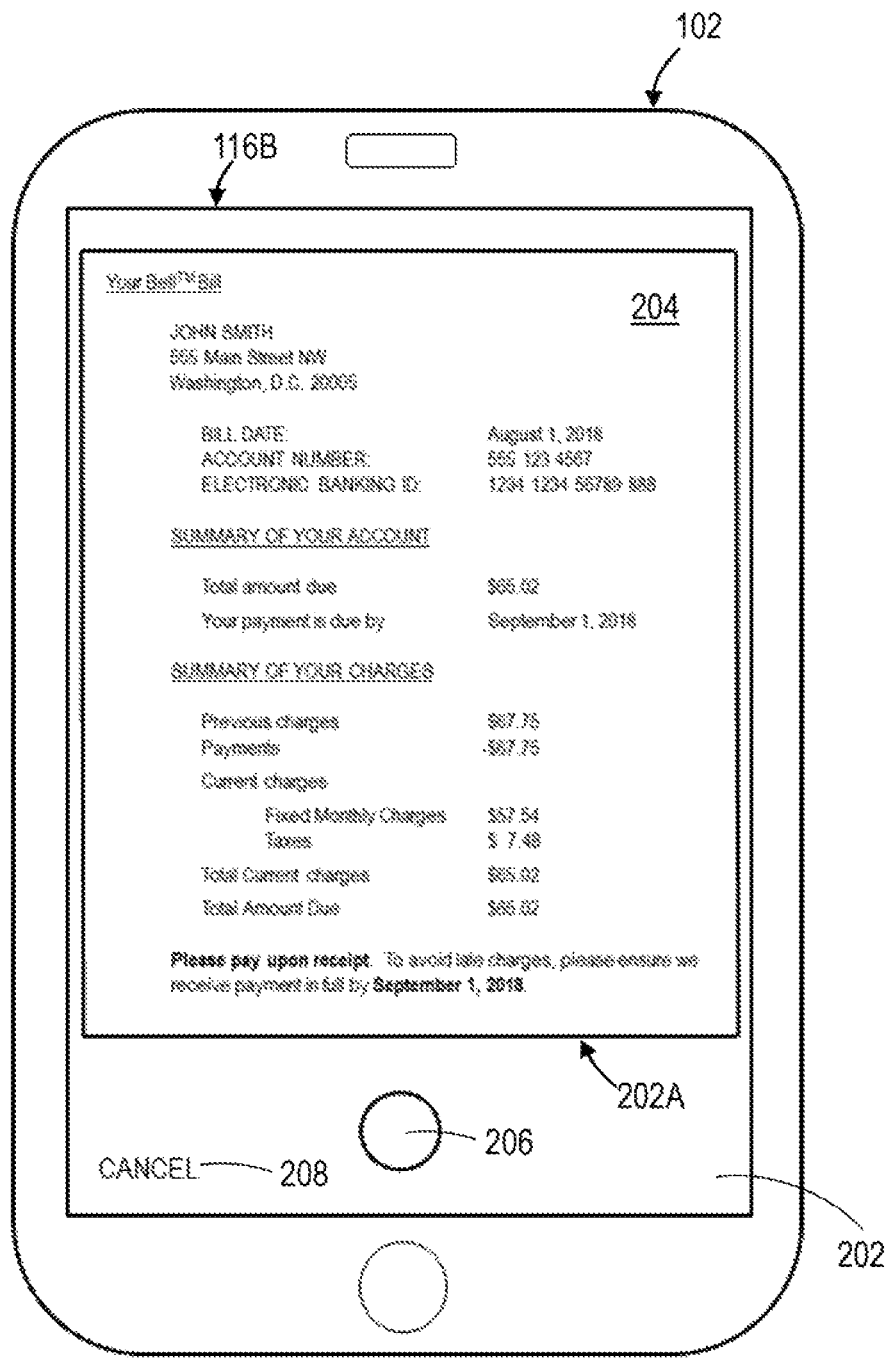
FIG. 2 is a diagram illustrating portions of an exemplary graphical user interface, consistent with the disclosed embodiments.

For example, as illustrated in FIG. 2, client device 102 may, upon execution of payment application 108, generate and display an image-capture interface 202 on display unit 116A. In some instances, image-capture interface 202 may prompt user 101 to position an outstanding bill or invoice, such as the outstanding invoice issued to user 101 by Bell™ Canada, within a corresponding field-of-view of digital camera 118 (not illustrated in FIG. 2), and executed payment application 108 may perform operations that display an image of the outstanding invoice, as captured by digital camera 118, within a corresponding viewing window 202A of image-capture interface 202.

The outstanding invoice, shown generally in FIG. 2 at 204, may include an identifier of user 101 (e.g., a name, such as "John Smith") and a mailing address associated with user 101's wireless account with Bell™ Canada (e.g., 555 "Main Street NW, Washington, D.C. 20005"). The outstanding invoice also identifies, among other things, a date upon which Bell™ Canada issued the invoice (e.g., "Aug. 1, 2018"), an account number assigned to user 101 by Bell™ Canada (e.g., "555 123 4567"), a total amount due (e.g., "$65.02," as specified under the "Summary of Your Account" and "Summary of Your Charges" headings), and a payment due date (e.g., "Sep. 1, 2018").

In some instances, user 101 may provide additional input to client device 102 that selects a corresponding image-capture icon 206 displayed within image-capture interface 202. By way of example, user 101 may select image-capture icon 206 by establishing contact between a finger (or stylus) and a portion of a surface of display unit 116A (e.g., a surface of a pressure-sensitive, touchscreen display unit) that corresponds to image-capture icon 206. Executed payment application 108 may perform operations that detect the selection of image-capture icon 206, and in response to the detected select, instruct digital camera 118 to capture image data corresponding to the display image of the outstanding invoice. In some instances, executed payment application 108 may instruct digital camera 118 to capture the image of the outstanding invoice in accordance with values of certain operational parameters of digital camera 118, which can be established or tuned in accordance with one or more computer vision processes, OCR processes, or machine learning processes implemented, as described herein. In other instances, user 101 may elect to cancel the image-capture process by performing any of the exemplary processes described herein to select "cancel" icon 208 of image-capture interface 202.

Figure 3A:
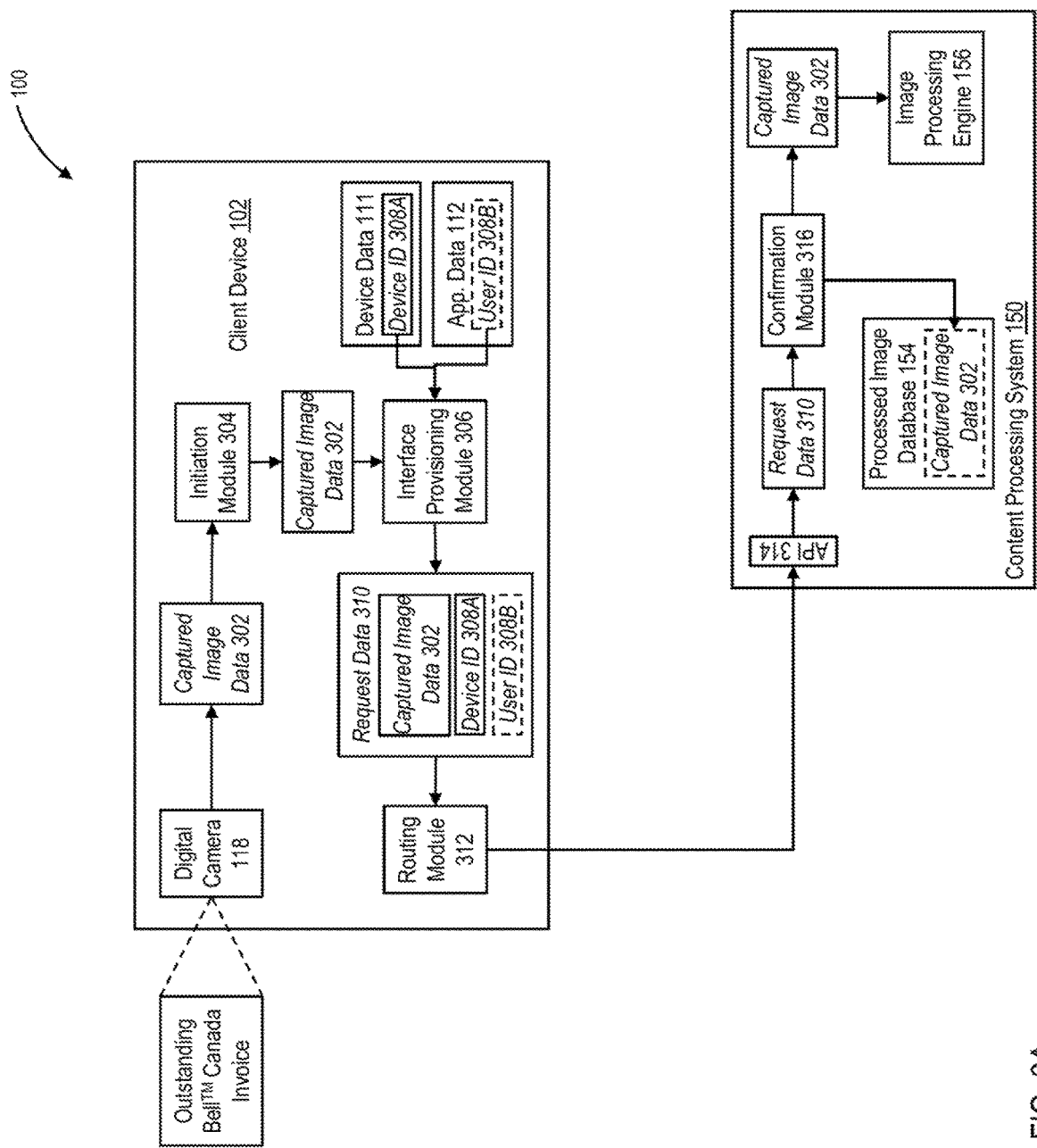
FIGS. 3A and 3B are diagrams illustrating portions of an exemplary computing environment, consistent with the disclosed embodiments.

Referring to FIG. 3A, digital camera 118 may capture the digital image of the outstanding wireless invoice (e.g., image 204, as displayed within viewing window 202A of image-capture interface 202 of FIG. 2) and may provide captured image data 302 as an input to an initiation module 304 of executed payment application 108. As described herein, captured image data 302 may identify the outstanding wireless invoice, and initiation module 304 may perform operations that store captured image data 302 within one or more tangible, non-transitory memories, e.g., within a portion of transaction database 114 (not illustrated in FIG. 3A). Further, initiation module 304 may provide captured image data 302 as an input to an interface provisioning module 306 of executed payment application 108.

In some instances, interface provisioning module 306 may receive the captured image data, which identifies the outstanding invoice issued by Bell™ Canada. Interface provisioning module 306 may perform operations that access device data 111, as maintained within data repository 110, and obtain device data 308A, such as, but not limited to, an IP address or a MAC address that uniquely identifies client device 102 within environment 100. Interface provisioning module 306 may also access application data 112, e.g., as further maintained within data repository 110, and obtain user data 308B that includes, but is not limited to, an alphanumeric login credential assigned to user 101 by transaction system 130 (e.g., which enables user 101 to access payment application 108).

In some examples, interface provisioning module 306 may package captured image data 302, along with device data 308A and additionally, or alternatively, user data 308B, into corresponding portions of request data 310, which interface provisioning module 306 may provide as an input to a routing module 312 of client device 102. Although not illustrated in FIG. 3A, routing module 312 may access the one or more tangible, non-transitory memories, and extract a network address associated with content provisioning system 150, such as, but not limited to, an IP address or a MAC address that uniquely identifies content provisioning system 150 within environment 100. Routing module 312 may transmit request data 310 across network 120 to the network address of content provisioning system 150, e.g., using any appropriate communications protocol.

A secure programmatic interface of content provisioning system 150, e.g., application programming interface (API) 314, may receive and route request data 310, which includes captured image data 302 (along with device data 308A and additionally, or alternatively, user data 308B), to a confirmation module 316 of content provisioning system 150. API 314 may be associated with or established by confirmation module 316, and may facilitate secure, module-to-module communications across network 120 between confirmation module 316 and routing module 312 of client device 102. In some examples, confirmation module 316 may parse request data 310 to extract device data 308A (an in some instances, user data 308B), and may perform operations that compare extracted device data 308A (and in some instances, user data 308B) against corresponding elements of locally maintained device or user data (not illustrated in FIG. 3A). Based on an outcome of the comparison, confirmation module 316 may determine whether client device 102 is permissioned to access content provisioning system 150 via API 314.

If, for example, confirmation module 316 were to detect an inconsistency between extracted and local copies of the device or user data, confirmation module 316 may determine that client device 102 lacks permission to access content provisioning system 150 via API 314. In response to the determined lack of permission, confirmation module 316 may discard request data 310, e.g., as received from client device 102, and content provisioning system 150 may perform additional operations that generate and transmit, to client device 102 across network 120, message data that indicating that client device 102, and executed payment application 108, lack permission to access content provisioning system 150 via API 314 (not illustrated in FIG. 3A).

Alternatively, if confirmation module 316 were to establish a consistency between the extracted and local copies of the device or user data, confirmation module 316 may parse request data 310 and extract captured image data 302. In some instances, confirmation module 316 may perform operations that store captured image data 302 within the one or more tangible, non-transitory memories (e.g., within a portion of processed image database 154). Further, confirmation module 316 may provide captured image data 302 as an input to image processing engine 156, which may perform any of the exemplary processes described herein to recognize textual content within corresponding portions of captured image data 302, to adaptively classify portions of the recognized textual content, and to extract, from the classified portion of the recognized textual content, values of parameters that characterize a digital payment in satisfaction of the outstanding invoice issued to user 101 by Bell™ Canada.

Figure 3B:
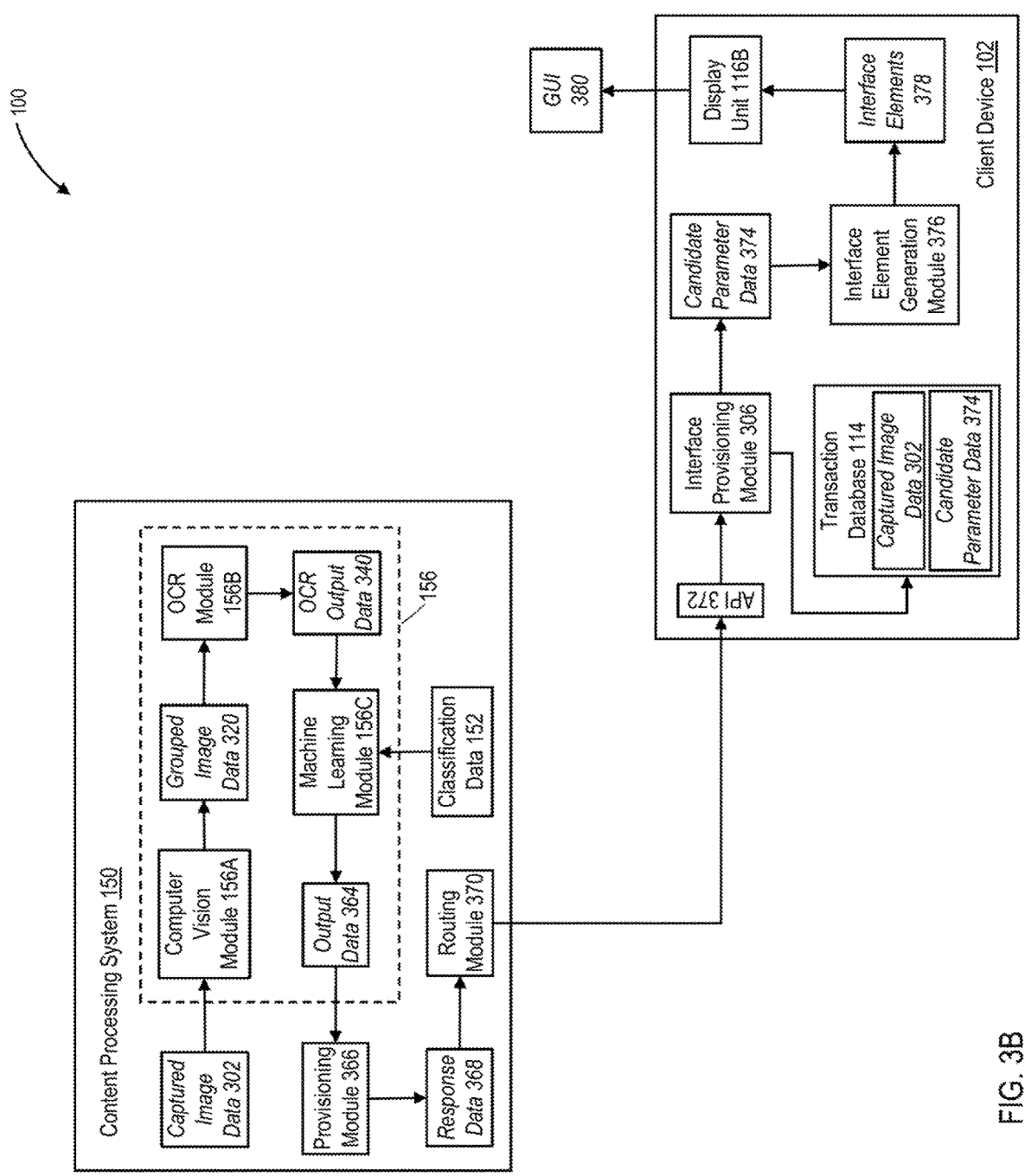

Referring to FIG. 3B, image processing engine 156 of content provisioning system 150 may receive captured image data 302 from confirmation module 316, and computer vision module 156A may apply one or more adaptive, computer-vision algorithms or processes to portions of captured image data 302. Examples of the one or more adaptive, computer-vision algorithms or processes include, but are not limited to, a template matching algorithm, a scale-invariant feature transform (SIFT) algorithm, an adaptive pattern recognition algorithm, and additional, or alternate, computer vision algorithms consistent with the OpenCV® library and the Google Cloud Vision API™.

As described herein, the application of the one or more adaptive, computer vision algorithms or processes to the portions of captured image data 302 may identify discrete regions within captured image data 302 that include corresponding groups of textual content. By way of example, the regions of captured image data 302, and the grouped textual context included within each of the regions, may correspond to discrete, bounded sections of the outstanding invoice and additionally, or alternatively, subsets or portions of the bounded sections within the outstanding invoice. Further, and based on an outcome of the one or more applied computer vision algorithms or processes, computer vision module 156A may generate grouped image data 320 that identifies and characterizes each of the discrete regions of captured image data 302. In one instance, illustrated in FIG. 3B, grouped image data 320 may include captured image data 302, along with additional appended data (e.g., metadata) specifying the discrete regions of captured image data 302 that include the portions of the textual content.

Figure 3C:
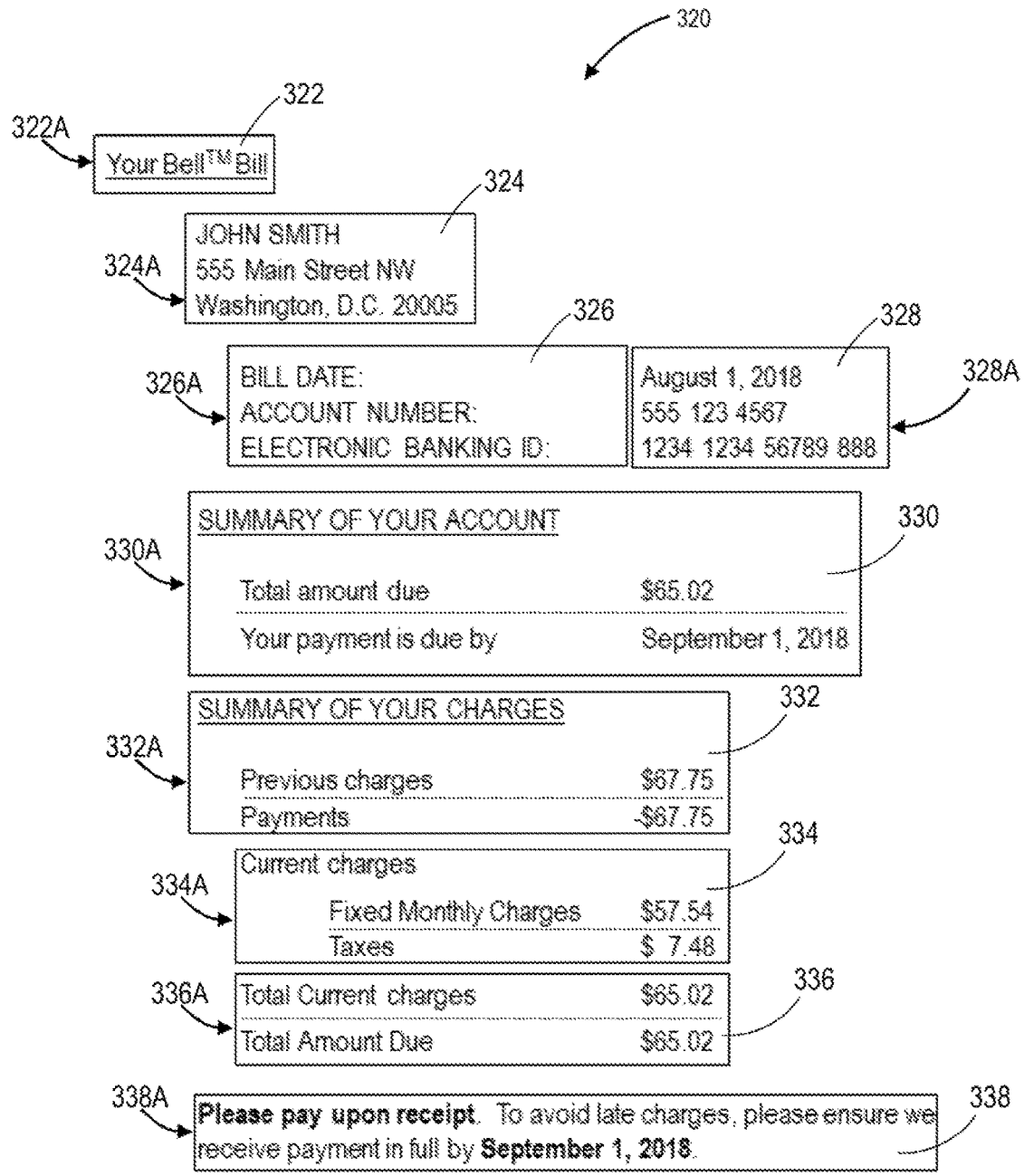

By way of example, as illustrated in FIG. 3C, grouped image data 320 may identify and characterize a plurality of discrete regions within captured image data 302 that include textual content. For instance, grouped image data may identify region 322, which includes grouped textual content identifying the outstanding wireless invoice as being issued by Bell™ Canada (e.g., "Your Bell™ Bill"), and which may be enclosed by regional boundary 322A. Further, as illustrated in FIG. 3C, grouped image data 320 may also identify region 324, which includes grouped textual content that identifies user 101 and is enclosed by regional boundary 324A. Grouped image data 320 may also include regions 326 and 328, which are established by corresponding ones of regional boundaries 326A and 328A, and which include textual content characterizing a date on which Bell™ Canada issued the outstanding invoice, an account number of user 101, and an electronic banking identifier.

As further illustrated in FIG. 3C, grouped image data 320 may also identify region 330, which includes textual content summarizing the outstanding invoice, and which is enclosed by regional boundary 330A. Additionally, in some instances, regions 332, 334, and 336 of grouped image data 320 may include textual content summarizing various "current" charges included within the outstanding invoice, and may be bounded and enclosed by corresponding ones of regional boundaries 332A, 334A, and 336A. Additionally, as illustrated in FIG. 3C, grouped image data 320 may further identify region 338, which includes textual content specifying a payment due date for the outstanding invoice, and which is bounded and enclosed by regional boundary 338A. The disclosed exemplary embodiments are, however, not limited to examples of regions, enclosed textual content, and regional boundaries, and in other instances, grouped image data 320 may identify any additional or alternate bounded region of captured image data 302, enclosed by corresponding boundaries of any additional or alternate geometry, that would be appropriate to the applied computer vision algorithms and to captured image data 302.

Referring back to FIG. 3B, computer vision module 156A may provide grouped image data 320 as an input to OCR module 156B. In other instances, and consistent with the disclosed exemplary embodiments, computer vision module 156A may populate grouped image data 320 with data specifying the boundaries of the identified regions of captured image data 302, which include the portions of the textual content. Computer vision module 156A may then provide grouped image data 320 as an input to OCR module 156B, along with captured image data 302 (not illustrated in FIG. 3B).

Figure 3D:
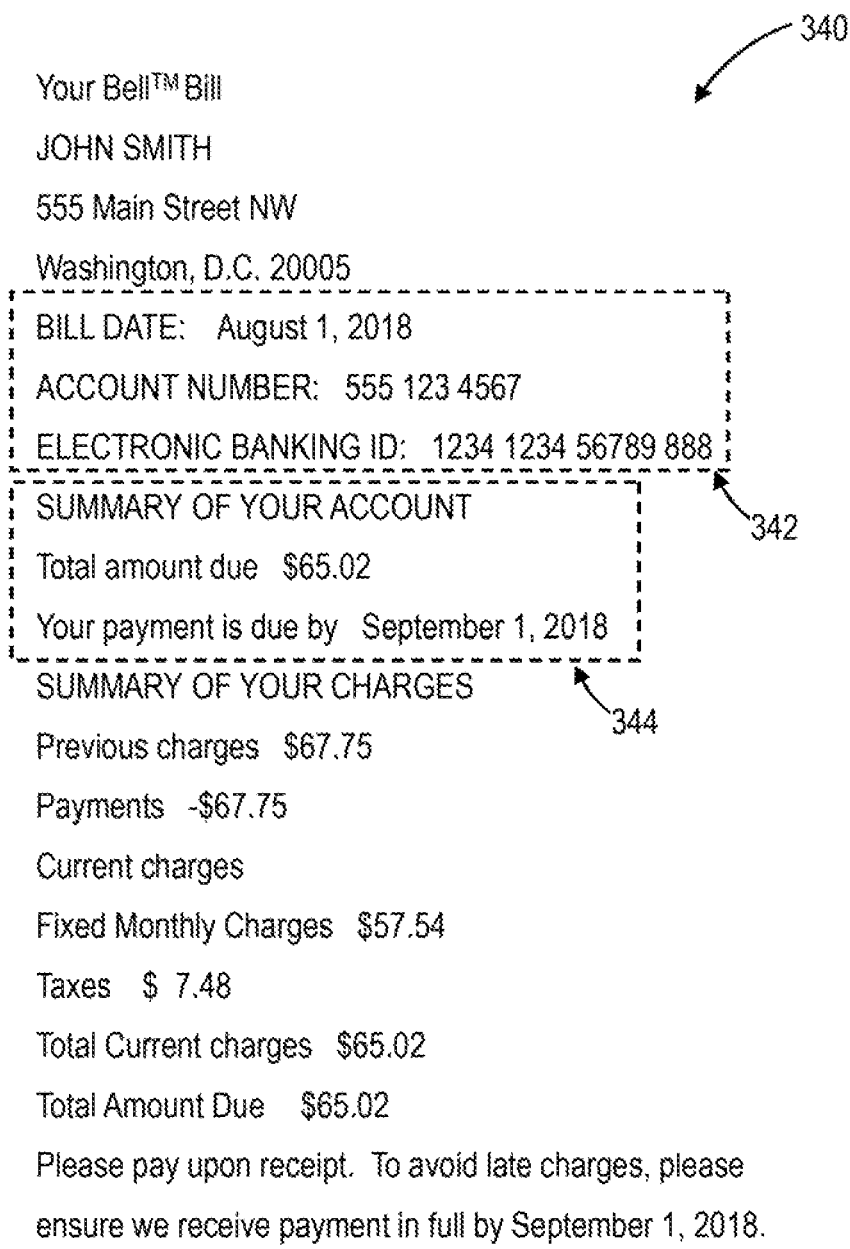

OCR module 156B may receive grouped image data 320 (e.g., alone or in conjunction with captured image data 302) and may process grouped image data 320 to identify those discrete regions of captured image data 302 that include textual content. Further, OCR module 156B may apply one or more OCR algorithms or processes to each of the discrete regions of captured image data 302 (e.g., as specified within grouped image data 320), and may generated OCR output data 340 that includes the textual content recognized within each of the discrete regions. Examples of the one or more OCR algorithms or processes include, but are not limited to, the Tesseract® OCR engine and one or more OCR processes consistent with the Google Cloud Vision API™ and FIG. 3D illustrates an exemplary portion of OCR output data 340. In other instances, the one or more OCR algorithms or processes may also include, but are not limited to, one or more optical word recognition processes, one or more intelligent character recognition processes, or intelligent word recognition processes.

In certain exemplary embodiments, OCR module 156B may repetitively process one or more of the bounded regions identified within grouped image data 320 to recognize corresponding portions of textual content from captured image data 302. For example, as illustrated in FIG. 3C, regions 326 and 328 may correspond to a "split grouping" in which one or more relevant labels within the outstanding invoice (e.g., "BILL DATE," "ACCOUNT NUMBER," and "ELECTRONIC BANKING ID") are split into a region (e.g., region 326 of FIG. 3C) separate from an additional region (e.g., region 328 of FIG. 3C) that includes the corresponding values. In some instances, OCR module 156B may perform any of the exemplary processes described herein to recognize textual content corresponding to each of split regions 326 and 328 from captured image data 302.

Further, OCR module 156B may generate and include, at a corresponding position within OCR output data 340, a concatenation, one a line-by-line basis, of the portion of textual content recognized and extracted from region 326 and the portion of textual content recognized and extracted from region 328. As illustrated in FIG. 3D, output portion 342 of OCR output data 340 corresponds to the textual content recognized from the split grouping of regions 326 and 328 of FIG. 3C.

In other instances, one or more of the bounded regions identified within grouped image data 320 may include textual content that specifies multiple sets of relevant labels and corresponding values. For example, as illustrated in FIG. 3C, bounded region 330 may include textual content that specifies a sectional heading of the outstanding invoice (e.g., "SUMMARY OF YOUR ACCOUNT"), along with labels and corresponding values specifying a total amount due (e.g., "$65.02") and a payment due date (e.g., "Sep. 1, 2018"). In some examples, OCR module 156B may perform any of the exemplary processes described herein to recognize textual content corresponding to sectional heading and each set of labels and corresponding values within bounded region 330 of captured image data 302.

The recognized textual content within bounded region 330 may also include control characters, such as a newline delimiter (e.g., in ASCII format or other appropriate formats), that identify a completion of a respective line of textual content and a start of a new line of textual content. In some instances, based on a detection of the control characters within the extracted textual content, OCR module 1566 may perform operations that parse and decompose the extracted textual content into discrete lines of textual content, which OCR module 1566 may include at a corresponding position within OCR output data 340. As illustrated in FIG. 3D, output portion 344 of OCR output data 340 corresponds to the textual content recognized and extracted from the bounded region 330 of FIG. 3C. Further, corresponding ones of these exemplary processes may be repetitively applied by OCR module 156B to each "split grouping" of bounded regions within grouped image data 320, and to each bounded region within grouped image data 320 that includes multiple sets of relevant labels and corresponding values Referring back to FIG. 3B, OCR module 156B may provide OCR output data 340 as an input to machine learning module 156C of image processing engine 156, which may perform any of the exemplary processes described herein to classify portions of the recognized textual content in accordance with classification parameters specified within classification data 152. As described herein, the classification parameters specified within classification data 152 may be of relevance to a document type that characterizes the document identified within captured image data 302. By way of example, the identified document may correspond to a bill (e.g., the document class or type characterizing the outstanding invoice issued by Bell™ Canada), and the classification parameters that characterize that document type include, but are not limited to, "account label," "due date," "vendor," "total due," and "other." In further instances, and as described herein, one or more of these classification parameters may correspond to, and characterized, discrete interface elements (e.g., fillable text boxes) of a digital interface generated and rendered for presentation by an application program executed by client device 102, such as a payment interface generated by executed payment application 108, which facilitates a scheduling of a payment transaction associated with the outstanding invoice.

Machine learning module 156C may receive OCR output data 340, which includes discrete elements of textual content (e.g., discrete lines of text) recognized and obtained from captured image data 302. Machine learning module 156C may also access classification data 152 and obtain one or more classification parameters that characterize the outstanding invoice identified within captured image data 302 (e.g., "account label," "due date," "vendor," "total due," "other," etc.). In some instances, and based on an application of one or more adaptive, machine learning algorithms or processes to OCR output data 340, machine learning module 156C may classify each of the discrete elements of text (e.g., the discrete lines of text) within OCR output data 340 in accordance with the obtained classification parameters.

Examples of these adaptive, machine learning processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of textual content (e.g., a line of text within OCR output data 340) and a single classification parameter (e.g., a "vendor") and additionally, or alternatively, multiple classification parameters (e.g., an "account label" and a "vendor").

Based on the output of the one or more machine learning algorithms or processes, such as the one-dimensional, convolutional neural network model described herein, machine learning module 156C may perform operations that classify each of the discrete elements of textual content (e.g., lines of text recognized and extracted from captured image data 302) as a corresponding one of the "account label," "due date," "vendor," "total due," and "other" classification parameters, e.g., as obtained from classification data 152. For instance, as illustrated in FIG. 3E, machine learning module 156C may access text lines 346 and 348 of OCR output data 340, and may perform any of the exemplary processes described herein to classify text line 346 as being relevant to the "vendor" classification label, and to classify text line 348 as being relevant to the "account label" classification parameter.

In other instances, also illustrated in FIG. 3E, machine learning module 156C may access text lines 350, 354, and 356 of OCR output data 340, and may perform any of the exemplary processes described herein to classify each of these text lines as being relevant to the "total due" classification parameter. Machine learning module 156C may also access text lines 352 and 358 of OCR output data 340 and may perform any of the exemplary processes described herein to classify each of these text lines as being relevant to the "due date" classification parameter.

Further, although not illustrated in FIG. 3E, machine learning module 156C may access additional or alternate text lines, or other elements of textual content, within OCR output data 340, and may perform any of the exemplary processes described herein to classify each of these text lines as being relevant to the exemplary classification levels described above and additionally, or alternatively, to the "other" classification parameter. The disclosed embodiments are, however, not limited to these exemplary classification parameters, or to these exemplary textual elements, and in other instances, machine learning module 156C may implement any of the exemplary machine learning algorithms or processes to classify any additional, or alternate, element of textual context within OCR output data 340 in accordance with any additional, or alternate, classification parameter appropriate to captured image data 302.

Referring back to FIG. 3B, machine learning module 156C may also perform any of the exemplary processes described herein to identify candidate parameter values within each of the classified elements of textual content, and to extract those candidate parameter values from the classified portions of textual content. For example, based on an application of one or more additional, or alternate, adaptive machine learning algorithms or processes to the classified elements of textual content, machine learning module 156C may perform operations that extract the candidate parameter value from each of the classified portions and compute a value (e.g., a "confidence" score) indicative of a probability that the candidate parameter value accurately, and correctly, characterizes the corresponding classification parameter within the underlying document (e.g., the outstanding invoice issued by Bell™ Canada and identified by captured image data 302).

In some instances, the additional, or alternate, machine learning algorithms may include one or more adaptive, natural-language processing algorithms capable of parsing each of the classified portions of the recognized textual content and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

As illustrated in FIG. 3F, and based on an application of the one or more adaptive, natural-language processing algorithms to classified text line 346 of OCR output data 340, machine learning module 156C may extract, from classified text line 346, a candidate vendor name of "Bell™" associated with respective starting and ending indices 346A and 346B, and may compute a confidence score characterizing the candidate vendor name. Similarly, and based on an application of the one or more adaptive, natural-language processing algorithms to classified text line 348 of OCR output data 340, machine learning module 156C may extract, from classified text line 348, a candidate account label "555 123 4567" (e.g., associated with respective starting and ending indices 348A and 348B), and may compute a corresponding confidence score for the candidate account number.

In further instances, and based on an application of the one or more adaptive, natural-language processing algorithms to classified text lines 350 and 352 of OCR output data 340, machine learning module 156C may extract, from classified text line 350, a candidate payment amount of "$65.02" (e.g., associated with respective starting and ending indices 350A and 350B), and may extract, from classified text line 352, a candidate due date of "Sep. 1, 2018" (e.g., associated with respective starting and ending indices 352A and 352B). Machine learning module 156C may also perform any of the exemplary processes described herein to compute confidence scores corresponding to each of the candidate payment amount and the candidate due date. Further, although not illustrated in FIG. 3F, machine learning module 156C may also apply the one or more adaptive, natural-language processing algorithms to each additional, or alternate, classified element of textual content within OCR output data 340 to identify and extract a candidate value of a corresponding classification parameter, and to compute a confidence score characterizing each of the candidate values.

In some exemplary embodiments, described above in reference to FIGS. 3C-3F, captured image data 302 may include textual content that identifies a corresponding vendor associated with the underlying document (e.g., Bell™ Canada, which issued the outstanding invoice to user 101). In other exemplary embodiment, captured image data 302 may not include textual content identifying a corresponding vendor associated with the underlying document, and may instead include two-dimensional graphical content that identifies the vendor, or that is representative of that vendor. For example, instead of textual content reciting the name of Bell™ Canada, the outstanding invoice, and captured image data 302 that identifies the outstanding invoice, may include a two-dimensional graphical content, such as a logo, that customers would associated with Bell™ Canada.

To account for a presence of a non-textual vendor identifier within captured image data 302, machine learning module 156C may also apply a two-dimensional, convolutional neural network model (e.g., implemented using a corresponding neural network library, such as Keras®) to portions of captured image data 302. Based on the application of the two-dimensional, convolutional neural network model to captured image data 302, machine learning module 156C may perform operations that associate graphical content with a vendor (e.g., Bell™ Canada), determine a candidate name representative of the vendor and the graphical content, and further, compute a confidence score characterizing the candidate vendor name.

Referring back to FIG. 3B, machine learning module 156C may generate output data 364 that includes each of the candidate parameter values extracted from corresponding ones of the classified elements of textual content within OCR output data 340. Output data 364 also links each of the candidate parameter values to its corresponding confidence score and further, to a corresponding one of the classification parameters associated with the document identified by captured image data 302 (e.g., the outstanding invoice issued by Bell™ Canada). For example, and as described herein, output data 364 may include a candidate vendor name (e.g., Bell™ Canada), a candidate account label (e.g., "555 1123 4567"), a candidate payment amount (e.g., "$65.02"), and a candidate due date (e.g., "Sep. 1, 2018"), each of which may be linked to its corresponding confidence score and to its corresponding classification parameter.

In other examples, output data 364 may include multiple candidate values associated with, and characterizing, one or more of the classification parameters. For instance, due to ambiguities within the outstanding invoice, or defects within captured image data 302, machine learning module 156C may perform any of the exemplary processes described herein to extract multiple candidate payment amounts, compute a confidence score that characterizes each of the multiple candidate payment amounts, and further, link each of the multiple candidate payment amounts to its corresponding confidence score and to the "payment amount" classification parameter within output data 364.

Additionally, in some instances, the outstanding invoice may specify an initial payment due date, which may be separate from a subsequent, and final payment due date by a corresponding grace period. Machine learning module 156C may perform any of the exemplary processes described herein to extract multiple candidate due dates (e.g., the initial and final due dates), compute a confidence score that characterizes each of the multiple candidate due dates, and further, link each of the multiple candidate due dates to its corresponding confidence score and to the "due date" classification parameter within output data 364. The disclosed embodiments are, however, not limited to these examples of multiple candidate parameter values, and in other instances, machine learning module 156C may identify, extract, and characterize any additional or alternate number of candidate parameter values appropriate to captured image data 302 and to classification data 152.

Referring back to FIG. 3B, machine learning module 156C may provide output data 364 as an input to a provisioning module 366 of content provisioning system 150, which may perform operations that package all, or a portion of output data 364 into response data 368 for transmission to client device 102, e.g., across the secure, programmatic interface. In some instances, and prior to packaging output data 364 into response data 368, provisioning module 366 may perform additional operations that process certain portions of output data 364.

For example, and as described herein, output data 364 may link each of the classification parameters (e.g., vendor, account label, payment amount, and due date, respectively) to a corresponding candidate parameter value (e.g., Bell™ Canada, "555 123 4567," "$65.02," and "Sep. 1, 2018," respectively) and a corresponding confidence score. In some instances, provisioning module 366 may perform operations that strip or delete the corresponding confidence scores from each candidate parameter value (e.g., within output data 364), and package each of the candidate parameter values into response data 368, along with additional information identifying each of the classification parameters.

In other examples, output data 364 may associate one or more of the classification parameters with multiple candidate parameter values and corresponding confidence scores. In some instances, and for a particular classification parameter associated with multiple candidate parameter values, provisioning module 366 can perform operations identify a corresponding one of the multiple parameter values associated with a maximum confidence score, and package the corresponding candidate parameter value into a portion of response data 368, along with additional information identifying the particular classification parameter. In other instances, and for the particular classification parameter, provisioning module 366 can perform operations package a subset of the multiple parameter values a portion of response data 368 (e.g., a predetermined subset, a subset of multiple parameter values having confidence scores that exceed a threshold number, etc.), along with additional information identifying the particular classification parameter As illustrated in FIG. 3B, provisioning module 366 may provide response data 368 as an input to a routing module 370 of content provisioning system 150. In some instances, routing module 370 may access one or more tangible, non-transitory memories, and extract a network address of client device 102, such as, but not limited to, an IP address or a MAC address that uniquely identifies client device 102 within environment 100. Routing module 370 may transmit response data 368 across network 120 to the network address of client device 102, e.g., using any appropriate communications protocol.

A secure programmatic interface of client device 102, e.g., application programming interface (API) 372, may receive and route response data 368, which includes the candidate parameter values and the associated, and linked, classification parameters, to interface provisioning module 306. API 372 may be associated with or established by interface provisioning module 306, and may facilitate secure, module-to-module communications across network 120 between interface provisioning module 306 and routing module 370 of content provisioning system 150. In some examples, interface provisioning module 306 may parse response data 368 to extract each candidate parameter value and its corresponding linked classification parameter, and to provide candidate parameter data 374 that includes the extract candidate parameter values and the corresponding classification parameters as an input to an interface element generation module 376 of client device 102.

Interface provisioning module 306 may also perform operations that store candidate parameter data 374 within a corresponding portion of one or more tangible, non-transitory memories (e.g., within a portion of transaction database 114 of data repository 110). In some instances, interface module 306 may perform additional operations that store captured image data 302 within transaction database 114, and may link together or associate candidate parameter data 374 with captured image data 302.

Interface element generation module 376 may process candidate parameter data 374, and may generate and route one or more interface elements 378 to display unit 116A of client device 102, which may render interface elements 378 for presentation to user 101 within a graphical user interface (GUI) 380. In some instances, GUI 380 may correspond to a payment interface facilitating an initiation of a payment transaction, or a scheduling a recurring payment transaction, associated with the outstanding invoice issued by Bell™ Canada (e.g., as identified within captured image data 302). For example, GUI 380 may include corresponding interface elements such as text entry fields or text boxes, corresponding to each of the classification parameter specified within parameter data 374 (e.g., vendor, account label, payment amount, and due date, respectively). In some instances, interface element generation module 376 and display unit 116A may perform operations that, collectively, populate each of the text entry field or text boxes with a corresponding one of the candidate parameter values automatically and without intervention from user 101, as illustrated in FIG. 4.

Figure 4:
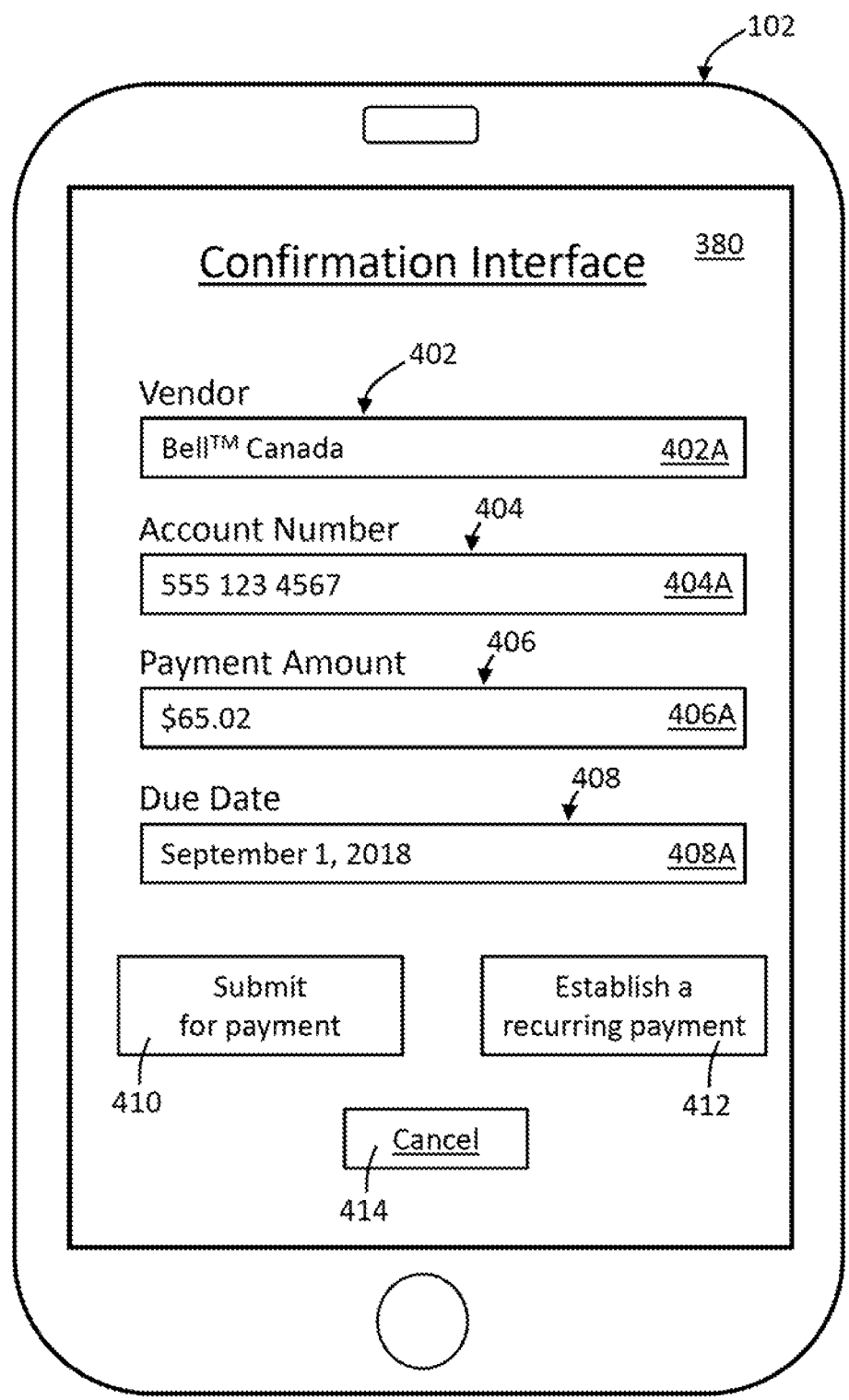
FIG. 4 is a diagram illustrating portions of an exemplary graphical user interface, consistent with the disclosed embodiments.

Referring to FIG. 4, GUI 380 includes, among other things, interface elements 402, 404, 406, and 408 that correspond to, respectively, a vendor, an account number, a payment amount, and a due data that characterize a payment transaction associated with the outstanding invoice issued by Bell™ Canada. Further, and as described herein, each of interface elements 402, 404, 406, and 408 may be associated with a corresponding one of the classification parameters specified within parameter data 374, as described herein, and may be populated with corresponding ones of the candidate parameter values specified within parameter data 374.

For example, interface element generation module 376 and display unit 116A may perform collective operations that populate interface element 402 (e.g., a fillable text box) with a corresponding vendor name 402A, e.g., Bell™ Canada, and that populate interface element 404 (e.g., another fillable text box) with a corresponding account label 404A, e.g., "555 123 4567." Further, interface element generation module 376 and display unit 116A may perform additional operations that populate interface element 406 (e.g., a further fillable text box) with a corresponding payment amount 406A, e.g., "$65.02," and that populate interface element 408 (e.g., an additional fillable text box) with a corresponding due date 404B, e.g., "Sep. 1, 2018." As described, interface element generation module 376 and display unit 116A may generate and populate GUI 380 automatically based on portions of parameter data 374 and without intervention from user 101. In other instances, not depicted in FIG. 4, interface element generation module 376 and display unit 116A may perform operations that, collectively, present the multiple candidate parameter values associated with a particular classification as recommendations within a corresponding one of interface elements 402, 404, 406, and 408.

In some instances, GUI 380, when populated with the candidate parameter values, enables user 101 to verify the accuracy of these candidate parameter values, and provide additional input to client device 102, e.g., via input unit 116B, that corrects or modifies one, or more, of the candidate parameter values within GUI 380. Further, although not depicted in FIG. 4, interface element generation module 376 and display unit 116 may fail to populate one or more of the text boxes included within GUI 380 (e.g., candidate parameter data 374 failed to include candidate parameter values for one or more of the classification parameters), and user 101 may provide additional input to client device 102, e.g., via input unit 116B, that specifies a parameter values within each of the empty text boxes.

Upon verification of the candidate parameter values, or upon modification, correction, or specification of one or more of the candidate parameter values, user 101 may provide input to client device 102, via input unit 1166, that requests an initiation of the payment transaction in accordance with the now-verified parameter values, e.g., by selecting icon 410 within GUI 380. In other instances, user 101 may provide additional, or alternate, input to client device 102, via input unit 116B, that requests an establishment of a recurring payment transaction in accordance with the now-verified payment values, e.g., by selecting icon 412 within GUI 380. Further, in some instances, user 101 may elect to cancel the payment initiation and scheduling processes described herein, and may provide input to client device 102, via input unit 116B, that selects "Cancel" icon 414 within GUI 380.

Figure 5:
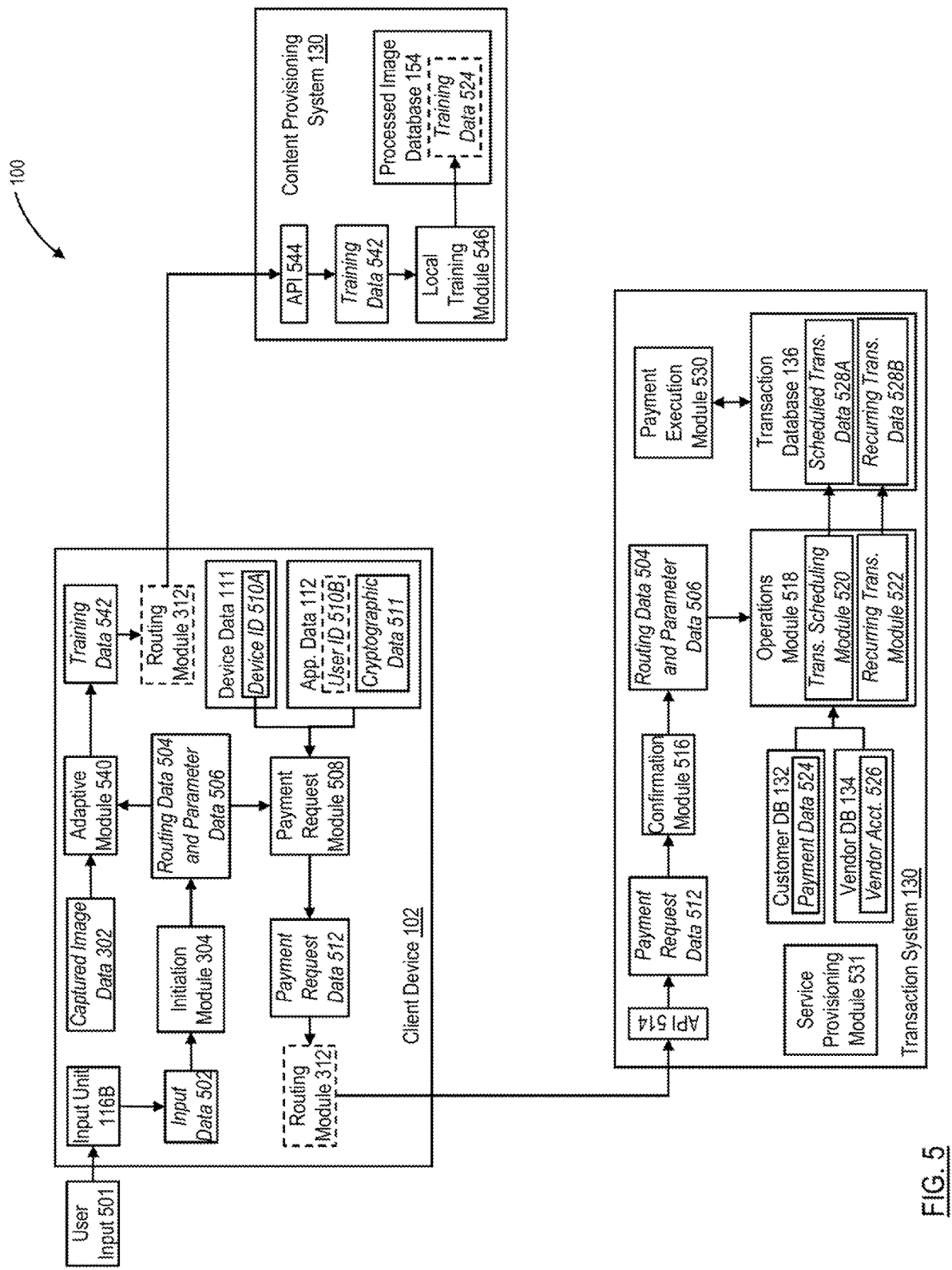
FIG. 5 is a diagram illustrating portions of an exemplary computing environment, consistent with the disclosed embodiments.

Referring to FIG. 5, and in response to the presentation of GUI 380 on display unit 116A, user 101 may provide any of the exemplary input described herein, e.g., user input 501, to input unit 116B of client device 102. For example, user input 501 may verify the accuracy of the candidate parameter values populated into GUI 380, or may specify a modification of, a correction to, or an addition of one or more of the parameter values within corresponding one of the text boxes presented within GUI 380. Further, in some instances, user input 501 may also include data requesting that transaction system 130 schedule of a payment transaction in accordance with the now-verified parameter values, or alternatively, additional data requesting that transaction system 130 establish a recurring payment transaction based on the now-verified parameter values.

Input unit 116B may receive user input 501, and may provide input data 502 (e.g., representative of user input 501) as an input to initiation module 304 of executed payment application 108. In some instances, initiation module 304 may parse input data 502 to extract routing data 504 and parameter data 506, which may be provided as inputs to a payment request module 508 of executed payment application 108. For example, routing data 504 may include information (e.g., a flag, metadata, etc.) specifying an intention of user 101 to: (i) schedule a payment transaction in accordance with the verified parameter values: and additionally, or alternatively, (ii) establish a recurring payment transaction based on the one or more of the verified parameter values.

Further, in some instances, input data 502 may include each of the verified parameter values displayed within GUI 380 (e.g., the verified vendor name, account number, payment amount, and due date), and initiation module 304 may perform operations that populate parameter data 506 with the each of the verified parameter values included within input data 502. In other instances, input data 502 may not include any verified parameter values (e.g., if user 101 elected to make no changes to the candidate parameter values displayed within GUI 380), or may include one or more parameter values modified, corrected, or added based on user input 501 to GUI 380. Initiation module 304 may, for example, perform operations that populate parameter data 506 with those parameter values included within input data 502 (if any), access a locally maintained copy of candidate parameter data 374 (e.g., within data repository 110 of FIG. 1), and populate parameter data 506 with additional, or alternate, parameter values specified within accessed candidate parameter data 374.

As illustrated in FIG. 5, payment request module 508 may receive routing data 504 and parameter data 506, and may perform operations that access device data 111, as maintained within data repository 110, and obtain device data 510A, such as, but not limited to, an IP address or a MAC address that uniquely identifies client device 102 within environment 100. Payment request module 508 may also access application data 112, e.g., as further maintained within data repository 110, and obtain user data 5106 and cryptographic data 511. In some instances, user data 5106 includes, but is not limited to, an alphanumeric login credential assigned to user 101 by transaction system 130 (e.g., which enables user 101 to access payment application 108), and cryptographic data 511 includes but not limited to, a unique cryptogram, cryptographic key, hash value, commitment, or other cryptographic element that allows transaction system 130 to verify payment application 108 or client device 102. In some examples, payment request module 508 may package routing data 504 and parameter data 506, along with device data 510A and cryptographic data 511 (and in some instances, user data 510B) into corresponding portions of payment request data 512, which payment request module 508 may provide as an input to a routing module 312 of client device 102.

Payment request module 508 may also perform operations that store all, or a portion, of parameter data 506 within a corresponding portions of transaction database 114 (e.g., as maintained within data repository 110). In some instances, payment request module 508 may link stored parameter data 506 (e.g., which specifies parameter values of a payment transaction associated with the outstanding invoice issued by Bell™ Canada) to a corresponding captured digital image of the outstanding invoice issued by Bell™ Canada, e.g., captured image data 302. By storing and linking together parameter data 506 and captured image data 302, payment request module 508 may perform operations that establish (incrementally) searchable payee or vendor data that, when processed by executable payment application 108, facilitates a dynamic correction and additionally, or alternatively, a dynamic completion, of elements of text entered within one or more graphical user interfaces generated by executed payment application 108, such as GUI 380 described herein. In some instances, certain of these dynamic completion or correction processes apply one of more filtering schemes to the searchable payee or vendor data, including those that filter out those payees or vendors associated with geographic regions that are inconsistent with, or separated from a geographic region associated with user 101 or client device 102.

Routing module 312 may access the one or more tangible, non-transitory memories, and extract a network address associated with transaction system 130, such as, but not limited to, an IP address or a MAC address that uniquely identifies transaction system 130 within environment 100. Routing module 312 may transmit payment request data 512 across network 120 to the network address of transaction system 130, e.g., using any appropriate communications protocol.

A secure programmatic interface of transaction system 130, e.g., application programming interface (API) 514, may receive and route payment request data 512, which includes routing data 504 and parameter data 506 (along with device data 510A, cryptographic data 511, and in some instances, or alternatively, user data 510B), to a confirmation module 516 of transaction system 130. API 514 may be associated with or established by confirmation module 516, and may facilitate secure, module-to-module communications across network 120 between confirmation module 516 and routing module 312 of client device 102.

In some examples, confirmation module 516 may parse request data 310 to extract device data 510A and cryptographic data 511 (and in some instances, user data 510B), and perform operations that confirm an identity of client device 102 and in some instances, of user 101, based on locally maintained device and/or user data, e.g., as maintained within customer database 132. Further, in some instances, confirmation module 516 may also verify an authenticity or an integrity of payment request data 512 based all or a portion of cryptographic data 511.

If, for example, confirmation module 316 were to detect an inconsistency between extracted device data 510A or user data 5106 and corresponding portions of locally stored data (e.g., within customer database 132), or if confirmation module 316 were to unable to verify an authenticity or an integrity of payment request data 512, confirmation module 516 may decline to process payment request data 512. In some instances, confirmation module 516 may discard payment request data 512, e.g., as received from client device 102, and transaction system 130 may perform additional operations that generate and transmit, to client device 102 across network 120, message data that confirming the decision to decline the processing of payment request data 512.

Alternatively, if confirmation module 316 were to establish a consistency between extracted device data 510A or user data 510B and corresponding portions of locally stored data, and were to verify and authenticity and the integrity of payment request data 512, confirmation module 516 may parse payment request data 512 and extract routing data 504 and parameter data 506, which may be provided as inputs to an operations module 518 of transaction system 130, along with device data 510A and/or user data 5106. As illustrated in FIG. 5, operations module 518 may include: (i) a transaction scheduling module 520 that, when executed, performs any of the exemplary processes described herein to schedule a payment transaction in accordance with parameter data 506; and (ii) a recurring transaction module 522 that, when executed, performs any of the exemplary processes described herein to establish a recurring transaction based on portions of parameter data 506 and in some instances, based on additional information provided by user 101, e.g., via executed payment application 108 of client device 102.

In some instances, operations module 518 may process routing data 504 to determine whether user 101 intended to schedule the payment transaction in accordance with parameter data 506, or whether user 101 intended to establish the recurring payment transaction based on parameter data 506. If operations module 518 were to determine that user 101 intended to schedule the payment transaction, operations module 518 may perform operations that route parameter data 506, along with device data 510A and/or user data 5106, as inputs to transaction scheduling module 520 for further processing. Alternatively, is operations module 518 were to determine that user 101 intended to establish the recurring payment transaction, operations module 518 may perform operations that route parameter data 506, along with device data 510A and/or user data 510B, as inputs to recurring transaction module 522 for further processing.

For example, transaction scheduling module 520 may receive parameter data 506, along with device data 510A and/or user data 510B, from operations module 518. In some instances, transaction scheduling module 520 may access a portion of customer database 132 associated with user 101 (e.g., one or more profile data records that reference or include device data 510A and/or user data 510B), and extract customer payment data 524 specifying a payment instrument available to fund the scheduled payment transaction. For example, and as described herein, the accessed portion of customer database 132 may include profile data specifying that user intends to fund the scheduled payment transaction using a Visa™ credit card, and customer payment data 524 may include a tokenized or actual account number, an expiration data, a verification code, or other information that facilitates an initiation of a payment using the Visa™ credit card.

Further, transaction scheduling module 520 may access a portion of vendor database 134 associated with the vendor specified within parameter data 506 (e.g., one or more data records that associated with Bell™ Canada), and extract vendor account data 526 specifying an account configured to received funds from payment initiated, settled, and cleared using one or more appropriate payment protocols. For example, vendor account data 526 may for example, include an account number associated with the vendor account, a bank routing number associated with vendor account, and any additional or alternate data that facilitates a payment transaction transferring funds from the payment instrument account of user 101 (e.g., the Visa™ credit card account) to the vendor account (e.g., as configured to receive payment on behalf of Bell™ Canada).

In some instances, transaction scheduling module 520 may perform operations that package parameter data 506, customer payment data 524, and vendor account data 526 into corresponding portions of scheduled transaction data 528A. For example, scheduled transaction data 528A may include data sufficient to enable a payment execution module 530 of transaction system 130 to initiate a payment in the amount of $65.02 for the outstanding invoice issued to user 101 by Bell™ Canada (e.g., associated with account number "555 123 4567") on or before the payment due date of Sep. 1, 2018. Further, transaction scheduling module 520 may perform operations that store scheduled transaction data 528A within one or more locally accessible, tangible, non-transitory memories, e.g., within a portion of transaction database 136. In some instances, transaction scheduling module 520 may also incorporate additional information within scheduled transaction data 528A, e.g., a status flag, that reflect a "scheduled" status of the payment transaction.

Further, when user 101 intends to establish a recurring transaction, recurring transaction module 522 may receive parameter data 506, along with device data 510A and/or user data 510B, from operations module 518. In some instances, recurring transaction module 522 may perform any of the exemplary processes described herein to extract customer payment data 524 from customer database 132, and to extract vendor account data 526 from vendor database 134.

Recurring transaction module 522 may package parameter data 506, customer payment data 524, and vendor account data 526 into corresponding portions of recurring transaction data 528B. In some instances, recurring transaction module 522 perform additional operations that store recurring transaction data 528B within one or more locally accessible, tangible, non-transitory memories (e.g., within a portion of transaction database 136 associated with recurring transactions), thus establishing a recurring payment transaction associated with a monthly invoice issued to user 101 by Bell™ Canada.

For example, recurring transaction data 528B may include data sufficient to enable payment execution module 530 to initiate a recurring payment, e.g., on a monthly basis, for a invoice regularly issued to user 101 by Bell™ Canada (e.g., associated with account number "555 123 4567") on or before the corresponding monthly due date. Recurring transaction data 528B may include additional information, such as a status flag, that confirms a status of the payment transaction as "recurring."

In some exemplary embodiments, payment execution module 530 may perform any of the exemplary processes described herein to initiate, and execute, one or more scheduled or pending payment transactions in accordance with corresponding portions of parameter data, customer payment data, and vendor account data. For example, payment execution module 530 may access scheduled transaction data 528A, and determine a payment in the amount of $65.03 to Bell™ Canada, referencing an account number of "555 123 4567," is scheduled for initiation prior to a payment due date of Sep. 1, 2018.

In some instances, either on the September $1^{st}$ due date, or at predetermine time prior to that due date (e.g., a time period consistent with an appropriate payment protocol, etc.), payment execution module 530 may perform operations that identify the payment instrument selected by user 101 to fund the payment (e.g., the Visa™ credit card account identified by customer payment data 524), access account data characterizing an outstanding balance associated with the Visa™ credit card account, and increment the outstanding balance (and decrement the amount of available credit) to reflect the initiated payment of $65.02. Further, payment execution module 530 may also package parameter data 506 and vendor account data 526 (e.g., as extracted from scheduled transaction data 528A) into a payment request, which transaction system 130 may transmit across network 120 to one or more external computing systems configured to settle and clear the initiated payment between the Visa™ credit card of user 101 and the account of Bell™ Canada (not illustrated in FIG. 5). Payment execution module 530 may also perform operations (not illustrated in FIG. 5) that modify a status of the payment transaction from "scheduled" to "pending" within transaction database 136 (e.g., by modifying the corresponding status flag maintained within scheduled transaction data 528A).

Upon successful clearance and settlement of the initiated payment transaction, payment execution module 530 may receive confirmation data from the one or more external computing systems, e.g., through a secure programmatic interface. Based on the received confirmation, payment execution module 530 may also perform operations (also not illustrated in FIG. 5) that further modify the status of the payment transaction from "pending" to "executed" within transaction database 136 (e.g., by modifying the corresponding status flag maintained within scheduled transaction data 528A).

Further, in some instances (not illustrated in FIG. 5), payment execution module 530 may also generate additional confirmation data indicative of the clearance and settlement of the scheduled payment transaction, which transaction system 130 may transmit across network 120 to client device, e.g., through a secure, programmatic interface using any appropriate communications protocol. For example, client device 102 may receive the additional confirmation data, and executed payment application 108 may perform operations that render the additional confirmation data for presentation to user 101 within a corresponding interface, e.g., via display unit 116A.

Further, in some instances, payment application 108, when executed by client device 102, may perform additional operations that package captured image data 302, which identifies the outstanding invoice issued by Bell™ Canada, and portions of parameter data 506, which include verified, modified, or corrected parameter values extracted from captured image data 302 using any of the exemplary processes described herein, into corresponding portions of training data. As described herein, client device 102 may generate and transmit the training data across network 120 to content provisioning system 150, and one or more of the computer vision algorithms or processes, OCR algorithms or processes, and machine learning processes or algorithms (e.g., as implemented and applied by content provisioning system 150) may be trained against, and adaptively improved using, the training data, either alone or in conjunction within additional training data locally maintained within processed image database 154.

For example, an adaptive module 540 of executed payment application 108 may receive parameter data 506. Adaptive module 540 may also perform operations that access transaction database 114 (e.g., as maintained within data repository 110) and extract captured image data 302. Further, adaptive module 540 may package parameter data 506 and captured image data 302 into corresponding portions of training data 542, and adaptive module 540 may provide training data 542 as an input to routing module 312. Although not illustrated in FIG. 5, routing module 312 may extract, from the one or more tangible, non-transitory memories, a network address associated with content provisioning system 150, such as, but not limited to, an IP address or a MAC address that uniquely identifies content provisioning system 150 within environment 100. Routing module 312 may transmit training data 542 across network 120 to the network address of content provisioning system 150, e.g., using any appropriate communications protocol.

A secure programmatic interface of content provisioning system 150, e.g., an application programming interface (API) 544, may receive and route training data 542, which includes captured image data 302 and parameter data 506, to a local training module 546 of content provisioning system 150. API 544 may be associated with or established by local training module 546, and may facilitate secure, module-to-module communications across network 120 between local training module and routing module 312 of client device 102. In some examples, local training module 546 may perform operations that store training data 542 within a corresponding portion of processed image database 154, and train, and adaptive improve, one or more of computer vision algorithms or processes, OCR algorithms or processes, and machine learning algorithms or processes (e.g., the one- or two-dimensional, convolutional neural network models, the named entity recognition model, etc.), as described herein, using training data 542 and other elements of processed image database 154.

Certain of the exemplary, computer-implemented processes described herein can dynamically identify parameter values of an exchange of data, such as a digital payment transaction, based on application of one or more computer vision, optical character recognition, and machine learning algorithms or processes to captured image data. By populating portions of a graphical user interface associated with the data exchange automatically and without user intervention, certain of these exemplary, computer-implemented processes improve an accuracy of the populated parameter values and further enhance an ability of a user to access and interact with complex digital interfaces on communications devices characterized by limited display size of functionality, such as, but not limited to smartphones, and limited input functionality, limited display size, and limited display functionality, such as, but not limited to, wearable communications devices.

In other instances, client device 102, transaction system 130, and content provisioning system 150 may perform, individually or collectively, additional operations that support or improve one or more of the exemplary processes described herein for dynamically initiating, executing, and managing initiated or executed exchanges between network-connected devices or systems operating within environment 100. For example, although not illustrated in FIG. 5, a service provisioning module executed by transaction system 130, e.g., service provisioning module 531, may perform operations that access profile data maintained on behalf of user 101 within customer database 132, and may determine whether one or more of the payment instruments specified within the profile data (e.g., as funding preferences) represents a closed or an expired credit card account. In some instances, service provisioning module 531 may generate notification data that identifies the closed or expired credit card accounts, which transaction system 130 may transmit the notification across network 120 to client device 102, e.g., via a secure, programmatic interface.

Client device 102 may receive the notification data, which executed payment application 108 may render for presentation within a corresponding interface, e.g., on display unit 116A. In some instances, the presented notification data may prompt user 101 to provide additional input to client device 102, via input unit 116B, that remove the closed credit card account and/or updates the expired credit card, and client device 102 may package and transmit corresponding input data across network 120 to transaction system 130, which may perform operations that update the maintained profile data to reflect the received input data.

The disclosed embodiments are, however, not limited to these examples of payment-management notification data generated by transaction system 130. In further instances, service provisioning module 531 of transaction system 130 may perform additional operations that access a one or more data records of transaction database 136 that identify and characterize previously initiated, and executed, payment transactions. For example, and based on the accessed data records, service provisioning module 531 may perform operations that compute a mean payment amount characterizing payment transactions initiated or executed during a corresponding prior temporal, and when a payment amount of a scheduled payment transaction (e.g., as specified within scheduled transaction data 528A of transaction database 136), service provisioning module 531 may generate additional notification data characterizing the elevated payment amount. Transaction system 130 may transmit the additional notification data across network 120 to client device 102, e.g., via a secure, programmatic interface, and client device 102 may present the additional notification with an interface generated by executed payment application 108 automatically and without intervention from user 101.

Further, in some instances, service provisioning module 531 of transaction system 130 may access portions of transactions database 136 identifying and characterizing a scheduled payment (e.g., within scheduled transaction data 528A) or a recurring payment (e.g., within recurring transaction data 528B), and based on a comparison within portions of vendor database 134, may determine that the scheduled or recurring payment is associated with a closed or inactive vendor account. Service provisioning module 531 may generate a notification identifying the inactive or closed vendor account, and transaction system 130 may perform any of the exemplary processes described herein to transmit the generated notification to client device 102 for presentation within an interface generated by executed payment application, e.g., automatically and without intervention from user 101.

In other instances, one or more of the scheduled or recurring payment transactions (e.g., as identified and characterized by scheduled transaction data 528A or recurring transaction data 528B) may correspond to postdated transaction, and service provisioning module 531 of transaction system 130 may generate and transmit a postdated-transaction notification to client device 102 using any of the processes described herein. When displayed by client device 102 on an interface generated by executed payment application, the postdated-transaction notification may identify a scheduled initiation date and remind user 101 to ensure that a payment instrument associated with the postdated payment transaction is funded sufficiently on the scheduled initiation date. Further, in some instances, service provisioning module 531 of transaction system 130 may also generate and provision to client device 102 additional, or alternate, notification data associated with one or more payment scheduling and management functionalities, including, but not limited to, a notification that a vendor received funds from an initiated payment transaction or a notification that identifies on or more scheduled or recurring bills having upcoming initiation dates.

Further, when executed by client device 102, payment application 108 may generate one or more additional or alternate graphical user interfaces (GUIs) that enable user 101 to view, and manipulate, data maintained locally by transaction system 130, e.g., based on input provided to client device 102 via input unit 116B. For example, and subsequent to submitting an outstanding bill or payment using any of the exemplary processes described herein, executed payment application 108 may generate one or more interfaces that display, to user 101, information identifying one or more scheduled, but uninitiated, payment transactions, along with one or more initiated payment transactions awaiting settlement and clearance. In some instances, the one or more generated interfaces may prompt user 101 to provide additional input to client device, via input unit 1166, that edits one or more parameters of an initiated payment transaction, or deletes that initiated payment transaction, prior to settlement and clearance.

Additionally, the one or more generated interfaces may present, to user 101, a textual or graphical timeline identifying previously initiated, settled, and cleared payment transactions (e.g., corresponding to prior bills or invoices), and any upcoming, scheduled or recurring payment transactions (e.g., corresponding to upcoming bills or invoices) sorted by, among other things, due dates. In other instances, the one or more generated interfaces may display historical data identifying and characterizing those previously initiated, settled, and cleared payment transactions, and information on when initiated payment transactions will be settled and cleared.

Figure 6:
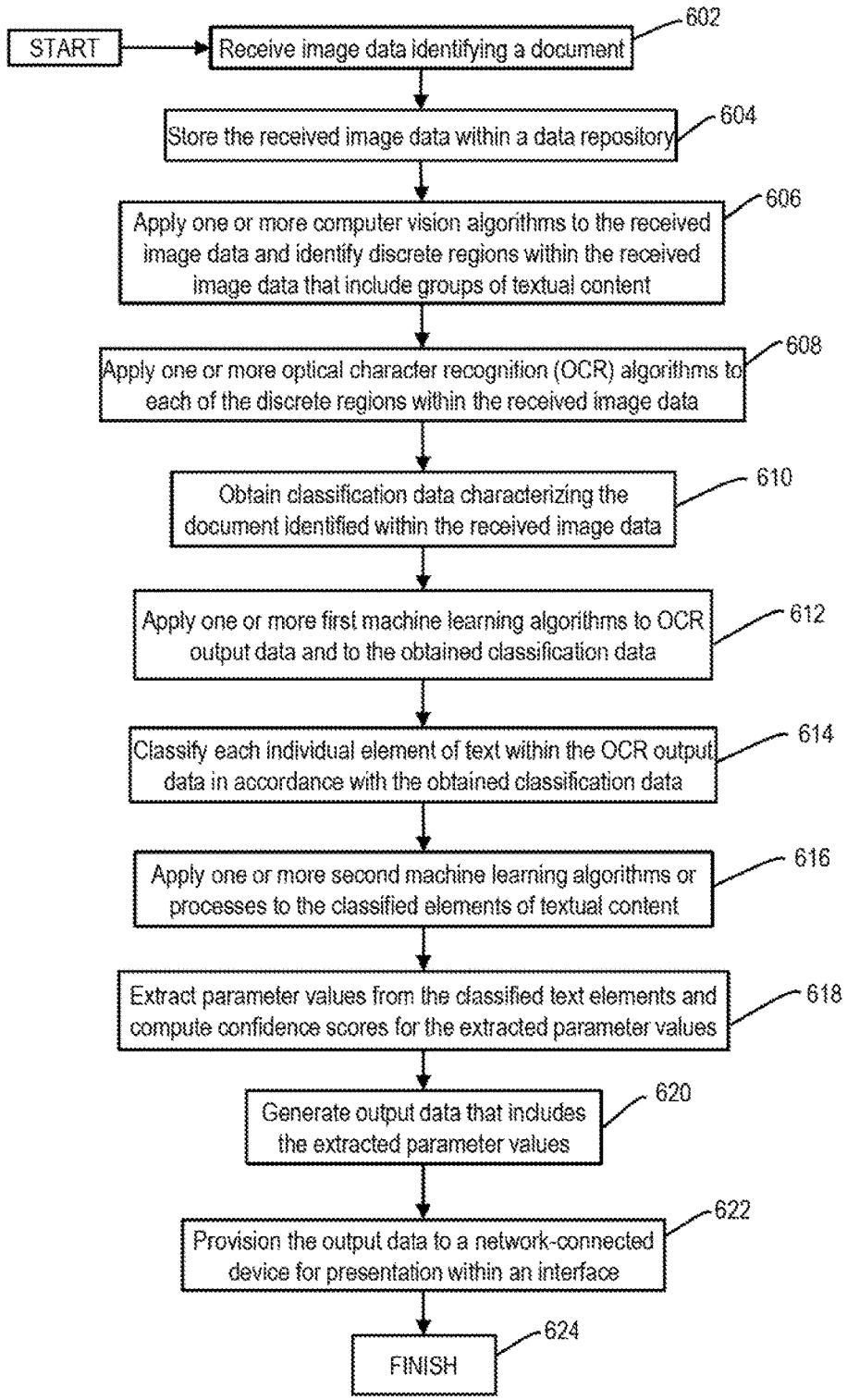
FIG. 6 is flowchart of an exemplary process for automatically generating and populating digital interface based on adaptively processed image data, consistent with the disclosed embodiments.

FIG. 6 is a flowchart of an exemplary process 600 for automatically generating and provisioning a digital interface based on dynamically captured image data, in accordance with the disclosed embodiments. In some examples, a network-connected computing system, such as content provisioning system 150 of FIG. 1, may perform one or more of the exemplary steps of process 600.

Referring to FIG. 6, content provisioning system 150 may receive image data that identifies a document associated with an exchange of data (e.g., in step 602). The document may, for example, correspond to an outstanding invoice or bill issued to a customer by a corresponding vendor (e.g., the outstanding invoice issued to user 101 by Bell™ Canada). Further, content provisioning system 150 may receive the image data from client device 102 across network 120 and through a secure programmatic interface, such as an application programming interface (API) associated with payment application 108 executed by client device 102. Additionally, and as described herein, client device 102 may include an embedded digital camera, such as digital camera 118, configured by executed payment application 108 to capture the image data identifying the outstanding invoice based on input provided to client device 102 by user 101, e.g., via input unit 116B.

Content provisioning system 150 may perform operations that store the received image data within the one or more tangible, non-transitory memories, such as within a portion of processed image database 154 of FIG. 1 (e.g., in step 604). Further, in some examples, content provisioning system 150 may perform any of the exemplary processes described herein to recognize textual content within corresponding portions of the received image data, to adaptively classify portions of the recognized textual content, and to extract, from the classified portions of the recognized textual content, values of parameters that characterize the exchange of data capable of initiation by client device 102, e.g., a payment transaction associated with the outstanding invoice issued to user 101 by Bell™ Canada.

In some instances, and based on an application of one or more adaptive, computer vision algorithms or processes to the portions the received image data, content provisioning system 150 may identify discrete regions within the received image data that include corresponding groups of textual content (e.g., in step 606). As described herein, examples of the one or more adaptive, computer-vision algorithms or processes include, but are not limited to, a template matching algorithm, a scale-invariant feature transform (SIFT) algorithm, an adaptive pattern recognition algorithm, and additional, or alternate, computer vision algorithms consistent with the OpenCV® library and the Google Cloud Vision API™. Further, and as described herein, the discrete regions of the received image data, and the grouped textual context included within each of the regions, may correspond to discrete, bounded sections within the outstanding invoice and additionally, or alternatively, subsets or portions of the discrete sections within the outstanding invoice.

Additionally, content provisioning system 150 may perform any of the exemplary processes described herein to apply one or more optical character recognition (OCR) algorithms or processes to each of the discrete regions within the received image data (e.g., in step 608). In some instances, an output of the applied OCR algorithms or processes (e.g., OCR output data 340 of FIG. 3B) includes the textual content recognized within each of the discrete regions, and as described herein, the recognized textual content within each of the discrete regions may include one or more elements of text, such as, but not limited to lines of text. Examples of the one or more OCR algorithms or processes include, but are not limited to, the Tesseract® OCR engine and one or more OCR processes consistent with the Google Cloud Vision API™.

In some instances, content provisioning system 150 may access one or more tangible, non-transitory memories, and obtain classification data (e.g., classification data 152 of FIG. 1) that identifies one or more classification parameters characterizing the document identified within the received image data, such as the outstanding invoice issued by Bell™ Canada to user 101 (e.g., in step 610). By way of example, the classification parameters that characterize the outstanding invoice issued by Bell™ Canada (and other similar bills or invoices issued by corresponding vendors) include, but are not limited to, "account label," "due date," "vendor," "total due," and "other," and as described herein, one or more of these classification parameters may correspond to, and characterized, discrete input elements of a digital interface generated and rendered for presentation by an application program executed by client device 102, such as a payment interface generated by executed payment application 108.

Further, content provisioning system 150 may perform any of the exemplary processes described herein to apply one or more first machine learning algorithms or processes to the OCR output data and to the obtained classification data (e.g., in step 612), and based on an output of the applied first machine learning algorithms or processes, to classify each of the individual elements of text (e.g., the discrete lines of text) within the OCR output data in accordance with the obtained classification parameters (e.g., in step 614).

Examples of these first machine learning algorithms or processes include, but are not limited to, one or more artificial, neural network models, such as a one-dimensional, convolutional neural network model, e.g., implemented using a corresponding neural network library, such as Keras®. In some instances, the one-dimensional, convolutional neural network model may implement one or more classifier functions or processes, such a Softmax® classifier, capable of predicting an association between an element of textual content (e.g., a line of text within the OCR output data) and a single classification parameter (e.g., a "vendor") and additionally, or alternatively, multiple classification parameters (e.g., an "account label" and a "vendor"). For instance, and based on the output of the one-dimensional, convolutional neural network model described herein (e.g., as generated in step 612), content provisioning system 150 may perform operations in step 614 that classify each of the discrete elements of textual content (e.g., lines of text recognized and extracted from the received image data) as a corresponding one of the "account label," "due date," "vendor," "total due," and "other" classification parameters, e.g., as obtained from the classification data.

Content provisioning system 150 may also perform any of the exemplary processes described herein to apply one or more second machine learning algorithms or processes to the classified elements of textual content (e.g., in step 616), and based on the application of the second machine learning algorithms or processes, to extract a parameter value from each of the classified text elements and compute a value (e.g., a "confidence" score) for each of the extracted parameter values (e.g., in step 618). By way of example, the confidence score associated with a corresponding parameter value may be indicative of a probability that the parameter value accurately, and correctly, characterizes the corresponding classification parameter within the underlying document (e.g., the outstanding invoice issued by Bell™ Canada and identified by the received image data).

As described herein, the second machine learning algorithms may include one or more adaptive, natural-language processing algorithms capable of parsing each of the classified elements of the recognized textual content and predicting a starting and ending index of the candidate parameter value within each of the classified portions. Examples of the adaptive, natural-language processing algorithms include, but are not limited to, natural-language processing models that leverage machine learning processes or artificial neural network processes, such as a named entity recognition model implemented using a SpaCy® library.

Further, although not illustrated in FIG. 6, content provisioning system 150 may be unable to classify one or more of the elements of text within the OCR output data, and additionally, or alternatively, may be unable to extract a parameter value from one or more of the classified text elements. In some instances, an individual, such as an employee of the financial institution that operates transaction system 130, or an agent or employee of an entity that administers content provisioning system 150, may inspect the received image data to classify, manually, one or more of the elements of text within the OCR output data or to identify, manually, the parameter value included within one or more of the classified text elements.

Referring back to FIG. 6, content provisioning system 150 may generate output data that includes each of the parameter values extracted from corresponding ones of the classified elements of textual content within the OCR output data (e.g., in step 620). In some instances, the generated output data also links each of the parameter values to its corresponding confidence score and further, to a corresponding one of the classification parameters associated with the document identified by captured the received image data (e.g., the outstanding invoice issued by Bell™ Canada). Content provisioning system 150 may perform any of the exemplary processes described herein to package all, or a portion of the output data into a corresponding message for transmission to client device 102, e.g., across the secure, programmatic interface (e.g., in step 622).

As described herein, and in response to the received output data, executed payment application 108 may cause client device 102 to perform any of the exemplary processes described herein to populate portions of a graphical user interface associated with the payment transaction (e.g., GUI 380 of FIG. 4) with corresponding ones of the parameter values automatically and without intervention from user 101. Exemplary process 600 is then complete is in step 624.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including image processing engine 156, computer vision module 156A, OCR module 156B, machine learning module 156C, initiation module 304, interface provisioning module 306, routing module 312, API 314, confirmation module 316, provisioning module 366, routing module 370, API 372, interface element generation module 376, adaptive module 540, payment request module 508, confirmation module 516, operations module 518, transaction scheduling module 520, recurring transaction module 522, payment execution module 530, and service provisioning module 531, can be implemented as one or more computer programs, i.e., one or more modules of computer program instructions encoded on a tangible non transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including by way of example a programmable processor, a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
a communications unit;
a storage unit storing instructions; and
at least one processor coupled to the communications unit and the storage unit, the at least one processor being configured to execute the instructions to:
receive a first signal from a device via the communications unit, the first signal comprising image data that includes a digital image of a document, the document being associated with an exchange of data capable of initiation by an application program executed at the device;
process the image data and detect, within a first portion of the digital image, a presence of first textual content associated with a first parameter of the data exchange;
extract the first textual content from processed image data, and extract a first value characterizing the first parameter from the first textual content; and
generate and transmit, via the communications unit, a second signal that includes the first value to the device, the second signal comprising information that instructs the executed application program to display, using a display unit of the device, the first value within a portion of an interface corresponding to the first parameter.

2. The apparatus of claim 1, wherein:
the at least one processor is further configured to receive the first signal through a programmatic interface associated with an application program executed by the device; and
the data exchange is capable of initiation by the executed application program.

3. The apparatus of claim 1, wherein the second signal includes the first value and data associating the first value with the first parameter.

4. The apparatus of claim 1, wherein the at least one processor is configured to:
apply one or more computer vision processes to the image data; and
based on the application of the one or more computer vision processes, detect the presence of the first textual content within the digital image and identify the first portion of the image data that includes the first textual content, the first portion corresponding to a first bounded region of the document that includes the first content.

5. The apparatus of claim 4, wherein the at least one processor is further configured to:
recognize the first textual content based on an application of one or more optical character recognition processes to the first portion of the digital image; and
generate first output data that includes the recognized first textual content.

6. The apparatus of claim 5, wherein the at least one processor is further configured to:
load, from the storage unit, classification data characterizing a plurality of parameters of the data exchange, the parameters comprising the first parameter; and
based on an application of one or more first machine learning processes to the first output data and to the classification data, perform operations that classify a first element of the recognized first textual content in accordance with the first parameter.

7. The apparatus of claim 6, wherein:
the first output data comprises the first element of the recognized first textual content and a second element of the recognized first textual content; and the at least one processor is further configured to:
- detect a presence of a control character within the recognized first textual content;
- decompose the first output data into the first and second elements based on the detected presence of the control character; and
- based on an application of one or more first machine learning processes to the decomposed first output data, perform operations that classify (i) the first element in accordance with the first parameter and (ii) the second element in accordance with a second one of the parameters.

8. The apparatus of claim 7, wherein:
at least one of the first or second elements comprise a line of textual content; and
the control character comprises a newline delimiter.

9. The apparatus of claim 6, wherein the at least one processor is further configured to:
- apply one or more second machine learning processes to the classified first element; and
- based on an application of the one or more second machine learning processes, extract the first parameter value from the classified first element and compute a confidence score associated with the first parameter value.

10. The apparatus of claim 5, wherein the at least one processor is further configured to:
- load, from the storage unit, classification data characterizing a plurality of parameters of the data exchange, the parameters comprising the first parameter; and
- based on an application of one or more first machine learning processes to the first output data and to the classification data, perform operations that classify a plurality of elements of the recognized first textual content in accordance with the first parameter;
- apply one or more second machine learning processes to the classified elements;
- based on an application of the one or more second machine learning processes, extract a parameter value from each of the classified elements and compute a confidence score associated with each of the extracted values; and
- establish, as the first value, a corresponding one of the parameter values associated with a maximum of the confidence scores.

11. The apparatus of claim 10, wherein the at least one processor is further configured to:
- generate parameter data that includes a subset of the extracted values and corresponding ones of the confidence scores, the parameter data associating the subset of the extracted values and the first parameter; and
- generate and transmit, via the communications unit, a third signal that includes the parameter data to the device, the third signal comprising information that instructs the executed application program to display, using the display unit of the device, each of the subset of the extracted parameter values within the portion of the interface corresponding to the first parameter.

12. The apparatus of claim 5, wherein the at least one processor is configured to:
- based on the application of the one or more computer vision processes, detect a presence of second textual content within the digital image and identify a second portion of the image data that includes the second textual content, the second portion corresponding to a second bounded region of the document that includes the second content, the second bounded region being disposed adjacent to the first bounded region within the document;
- recognize the second textual content based on an application one or more optical character recognition processes to the second portion of the image data;
- generate second output data that includes the recognized second textual content; and
- generate combined output data representative of a concatenation of the first and second output data.

13. The apparatus of claim 1, wherein the at least one processor is further configured to:
- detect, within a second portion of the digital image, a presence of second textual content associated with a second parameter of the data exchange;
- extract a second value characterizing the second parameter from the second textual content; and
- generate and transmit, via the communications unit, a third signal that includes the first and second parameter values to the device, the third signal comprising information that instructs the executed application program to display, using a display unit of the device, the first parameter value within the portion of the interface corresponding to the first parameter, and the second parameter value within a portion of the interface corresponding to the second parameter.

14. The apparatus of claim 1, wherein:
the data exchange comprises a payment transaction;
the document comprises an invoice associated with the payment transaction;
the first parameter comprises at least one of a transaction date, a transaction amount, an account associated with the payment transaction, or a counterparty to the payment transaction; and
the executed application program causes the device to transmit a request to initiate the payment transaction to a computing system, the request comprising the first value of the first parameter, and the request causing the additional computing system to perform operations that initiate of the payment transaction in accordance with at least the first value of the first parameter.

15. A computer-implemented method, comprising:
- receiving, by one or more processors, a first signal from a device, the first signal comprising image data that includes a digital image of a document, the document being associated with an exchange of data capable of initiation by an application program executed at the device;
- by the one or more processors, processing the image data and detecting, within a first portion of the digital image, a presence of first textual content associated with a first parameter of the data exchange;
- by the one or more processors, extracting the first textual content from the processed image data, and extracting a first value characterizing the first parameter from the first textual content; and
- generating and transmitting, by the one or more processors, a second signal that includes the first parameter value to the device, the second signal comprising information that instructs the executed application program to display, using a display unit of the device, the first parameter value within a portion of an interface corresponding to the first parameter of the data exchange.

16. A system, comprising:
a communications unit;
a storage unit storing instructions; and
at least one processor coupled to the communications unit and the storage unit, the at least one processor being configured to execute the instructions to:
- receive image data captured by a digital camera, the image data comprising a digital image of a document, and the document being associated with an exchange of data;
- generate and transmit, via the communications unit, a first signal that includes the image data to an additional computing system, the first signal comprising information that instructs the additional computing system to process the image data and detect, within a portion of the digital image, a presence of textual content associated with a parameter of the data exchange, to extract the textual content from the processed image data, and to extract a value characterizing the parameter from the textual content;
- receive a second signal from the additional computing system via the communications unit, the second signal comprising the extracted parameter value; and
- in response to the received second signal, display, using a display unit, the extracted parameter value within a portion of an interface corresponding to the parameter of the data exchange.

17. The system of claim 16, wherein the at least one processor is further configured to transmit the first signal to the additional computing system through a programmatic interface, the programmatic interface being associated with an application program executed by the at least one processor.

18. The system of claim 16, wherein the at least one processor is further configured to display the extracted parameter value within the portion of the interface without intervention from a user of the system.

19. The system of claim 16, wherein the information further instructs the additional computing system to:
- apply one or more computer vision processes to the image data; and
- based on the application of the one or more computer vision processes, detect the presence of the textual content within the digital image and identify the portion of the image data that includes the textual content;
- recognize the textual content based on an application one or more optical character recognition processes to the portion of the image data;
- generate output data that includes the recognized textual content;
- based on an application of one or more first machine learning processes to the output data, perform operations that classify an element of the recognized textual content in accordance with the parameter; and
- based on an application of one or more second machine learning processes to the classified element, extract the parameter value from the classified first element and compute a confidence score associated with the parameter value.

20. The system of claim 16, wherein:
the system further comprises an input unit coupled to the at least one processor; and
the at least one processor is further configured to:
- receive, through the input unit, data requesting at least one of (i) an initiation of the data exchange based on the displayed parameter value or (ii) an establishment of a recurring data exchange based on the displayed parameter value; and
- perform operations that, based displayed parameter value, schedule the initiation of the data exchange or establish the recurring data exchange.

* * * * *